US012051540B2

(12) United States Patent
Weng

(10) Patent No.: US 12,051,540 B2
(45) Date of Patent: Jul. 30, 2024

(54) MAGNETIC BUCKLE DEVICE

(71) Applicant: Tse-Haw Ling, Taipei (TW)

(72) Inventor: Chia-Wei Weng, Taipei (TW)

(73) Assignee: Tse-Haw Ling, Taipei (TW)

( * ) Notice: Subject to any disclaimer, the term of this patent is extended or adjusted under 35 U.S.C. 154(b) by 488 days.

(21) Appl. No.: 17/377,432

(22) Filed: Jul. 16, 2021

(65) Prior Publication Data

US 2022/0028592 A1 Jan. 27, 2022

(30) Foreign Application Priority Data

Jul. 21, 2020 (TW) ................................ 109124506
Sep. 25, 2020 (TW) ................................ 109133279

(51) Int. Cl.
*H01F 7/02* (2006.01)
*H01F 7/04* (2006.01)

(52) U.S. Cl.
CPC ............ *H01F 7/0263* (2013.01); *H01F 7/02* (2013.01); *H01F 7/0252* (2013.01); *H01F 7/04* (2013.01)

(58) Field of Classification Search
CPC . H01F 7/02; H01F 7/0252; H01F 7/04; H01F 7/0263
See application file for complete search history.

(56) References Cited

U.S. PATENT DOCUMENTS 11,647,815 B2 * 5/2023 Weng .................. A44B 19/301 24/303
2002/0129470 A1 9/2002 Kiely
2012/0044031 A1 2/2012 Ninomiya
2014/0339232 A1 11/2014 Fiedler
2015/0135486 A1 * 5/2015 Fiedler .................. A44B 11/26 24/303
2018/0078004 A1 3/2018 Baker
2022/0248809 A1 * 8/2022 Weng ................ A45C 13/1069

FOREIGN PATENT DOCUMENTS

CN 103945728 A 7/2014
CN 103957739 A 7/2014
CN 206213411 U 6/2017
CN 206852182 U 1/2018

(Continued)

*Primary Examiner* — Mohamad A Musleh

(74) *Attorney, Agent, or Firm* — BACON&THOMAS,PLLC

(57) ABSTRACT

A magnetic buckle device has a first base, an inserting component, a second base, a first component, and a second component. The inserting component can be inserted into the first base, which engages the inserting component. The first base and the second base can move or rotate with respect to each other, thereby converting the inserting component into the unbuckled state. The first and second components are respectively mounted on the second base and the inserting component. When the inserting component is close to an inserting component receiver of the first base, a magnetic attraction force is generated between the second component and the first component for drawing the inserting component to the inserting component receiver. When the inserting component is inserted completely, the magnetic attraction force auxiliary keeps the inserting component in the buckled state, so any additional buckling structure is not necessary.

17 Claims, 24 Drawing Sheets

(56) References Cited

FOREIGN PATENT DOCUMENTS

| | | | | | |
|---|---|---|---|---|---|
| DE | 102011086960 | A1 | | 5/2013 | |
| EP | 3494826 | A1 | * | 6/2019 | ......... A44B 11/2511 |
| JP | 58108715 | A | * | 6/1983 | ........... H01F 7/0263 |
| JP | 5108135 | B1 | * | 12/2012 | ......... A45C 13/1069 |
| JP | 2018164494 | A | | 10/2018 | |
| JP | 7232973 | B2 | * | 3/2023 | ........... A45C 13/123 |
| RU | 2415623 | C2 | * | 4/2011 | ............... A41F 1/00 |
| TW | 200511953 | A | | 4/2005 | |
| TW | 202014122 | A | | 4/2020 | |
| WO | WO-2009006888 | A2 | * | 1/2009 | ......... A45C 13/1069 |
| WO | WO-2010006594 | A2 | * | 1/2010 | ............. A44B 11/25 |
| WO | 2013031628 | A1 | | 3/2013 | |
| WO | WO-2021004457 | A1 | * | 1/2021 | ........... A44B 19/301 |

* cited by examiner

MAGNETIC BUCKLE DEVICE

BACKGROUND OF THE INVENTION

1. Field of the Invention

The present invention relates to a buckling device, especially to a buckle device that is applicable for various daily necessities such as bags, backpacks, boxes, etc., and the buckle device detachably connects two components.

2. Description of the Prior Arts

Currently, the luggage or bag is usually opened and closed via a zipper, and some specific luggage (such as a suitcase) may further comprise a buckle device. The zipper puller can be inserted into the buckle device and fixed. Thus, the zipper cannot be pulled, and thereby the luggage is locked.

However, one of the defects of the current buckle device is that: before the zipper puller is inserted into the buckle device, the user has to precisely align the zipper puller to the buckle device and then put the zipper puller into the buckle device with a certain force, which is not convenient. Especially, when locking the suitcase, one of the hands of the user may not be available, so it is difficult to insert the zipper into the buckle device.

To overcome the shortcomings, the present invention provides a magnetic buckle device to mitigate or obviate the aforementioned problems.

SUMMARY OF THE INVENTION

The main objective of the present invention is to provide a magnetic buckle device that may be operated with lower force so that it is more convenient.

The magnetic buckle device has a first base, an inserting component, a second base, a first component, and a second component. The inserting component is capable of being moved in an engaging direction and inserted into the first base, and thereby the inserting component is in a buckled state. Any one of the first base and the second base is capable of being moved or rotated with respect to the other, thereby the inserting component being in an unbuckled state. The first component is mounted on the second base. The second component is mounted on the inserting component. When the inserting component is inserted into the first base along the engaging direction, a magnetic attraction force is generated between the first component and the second component, thereby maintaining the inserting component in the buckled state.

When the magnetic buckle device is in use and the inserting component is moved close to the inserting component receiver of the first base, a magnetic attraction force is formed between the second component on the inserting component and the first component on the second base for guiding the inserting component. Therefore, the inserting component may be drawn to the inserting component receiver of the first base and the inserting component receiver is to receive the inserting component, which assists in inserting the inserting component. After the inserting component is inserted completely, the magnetic attraction force can keep the inserting component in the buckled state. Therefore, the present magnetic buckle device does not have too many buckling structures, so the force required by the user is reduced or even not needed at all. In other words, the inserting component may be positioned and engaged by the magnetic attraction force. The magnetic attraction force not only facilitates the insertion of the inserting component but also reduces the user's force required, which improves the convenience of use significantly.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
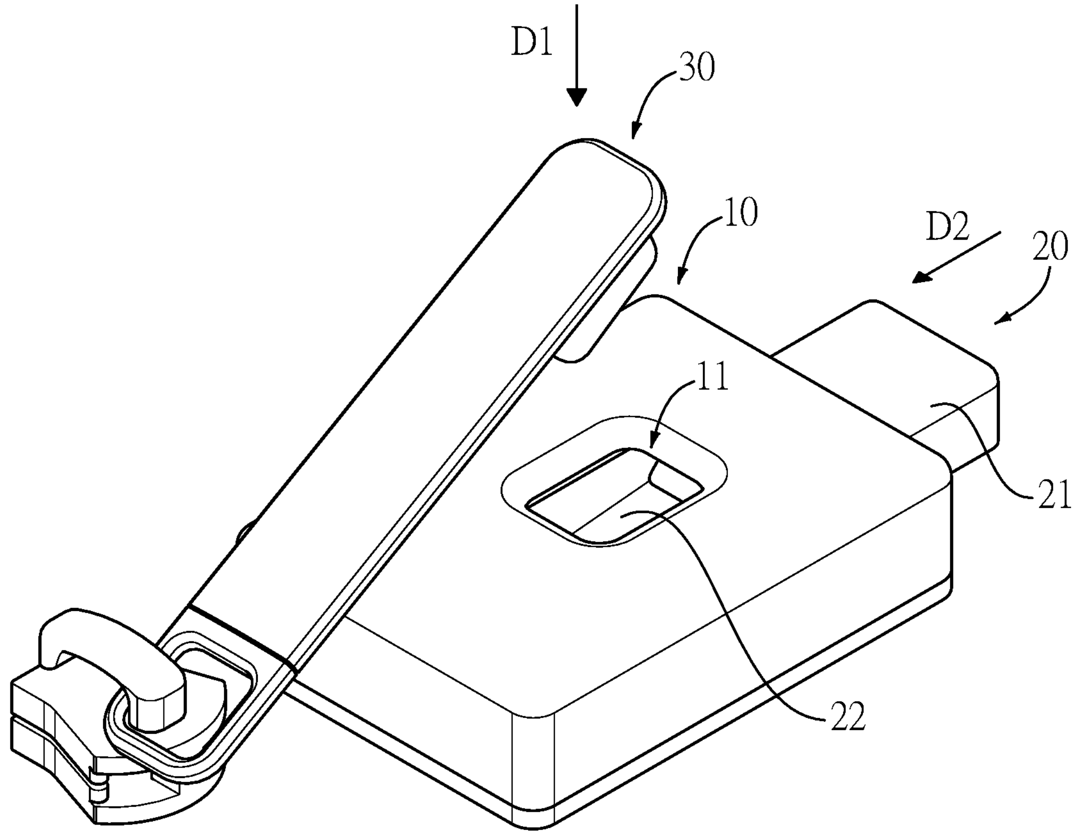
FIG. 1 is a perspective view of a magnetic buckle device in accordance with a first embodiment of the present invention.
Figure 2:
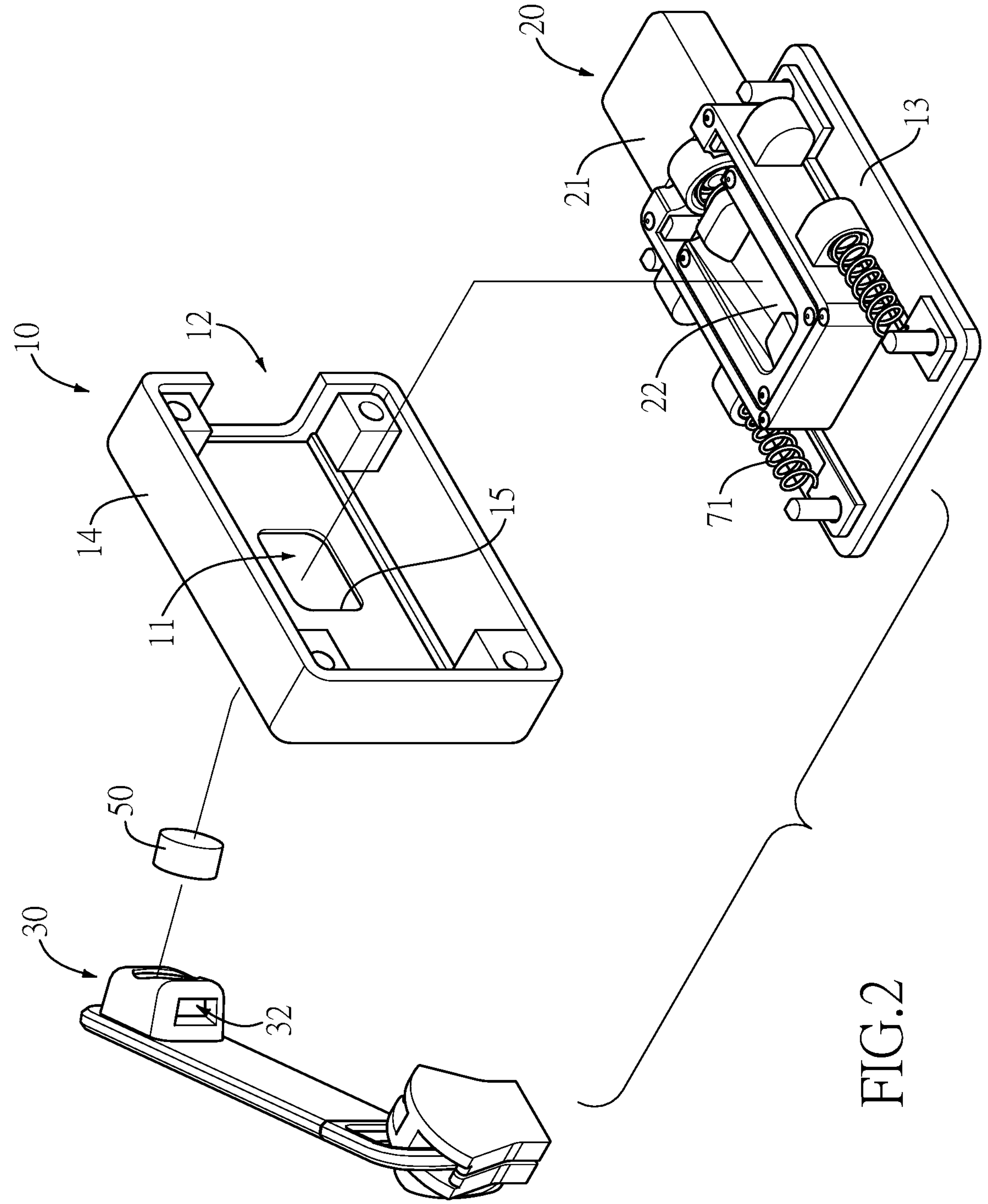
FIGS. 2 to 4 are exploded views of the magnetic buckle device in FIG. 1.
Figure 3:
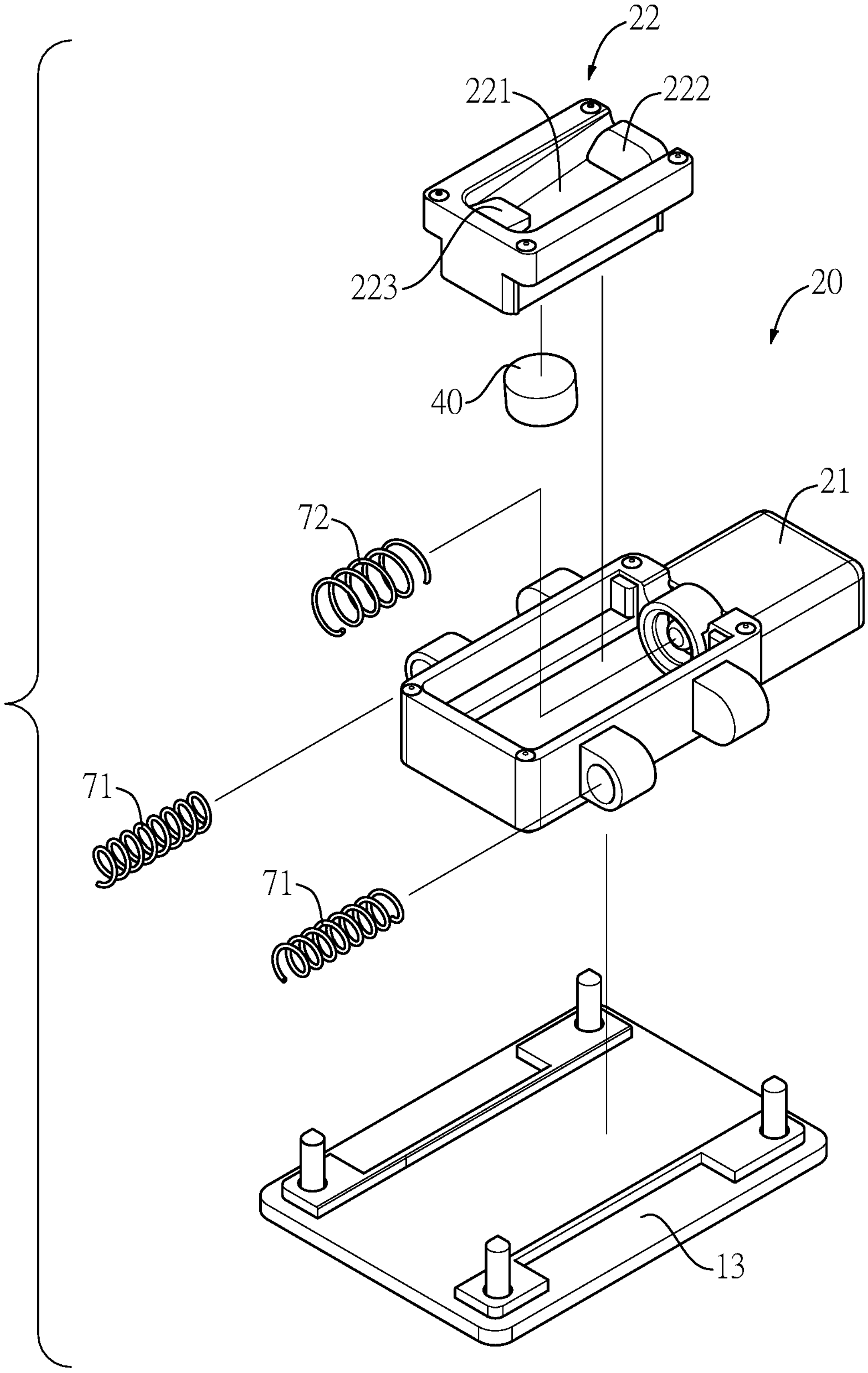
Figure 4:
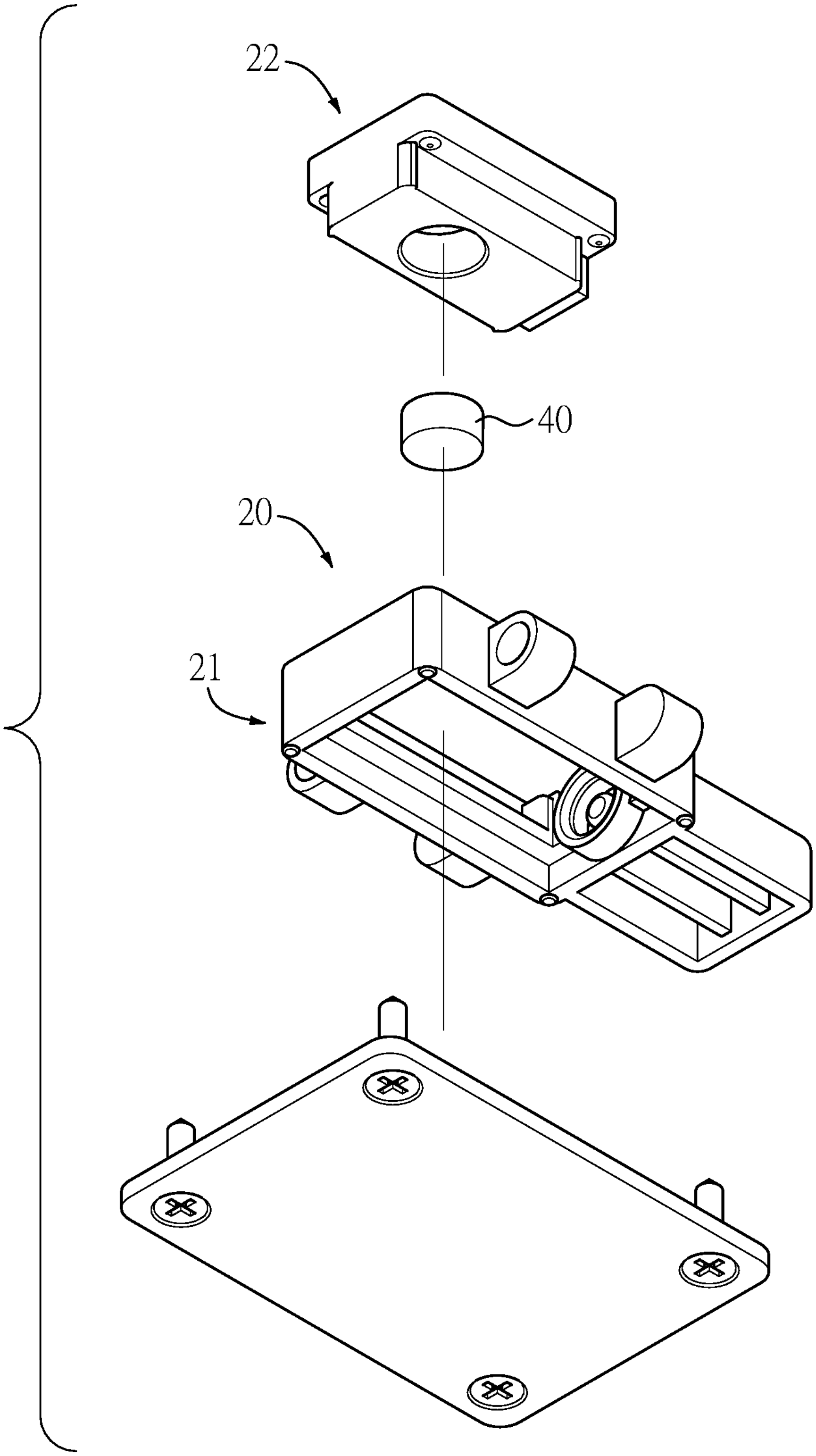

With reference to FIGS. 1 to 3, a magnetic buckle device in accordance with the present invention is provided. The magnetic buckle device comprises a first base 10, a second base 20, an inserting component 30, a first component 40, and a second component 50. The first base 10 and the inserting component 30 may be respectively mounted on two components that are configured to be engaged with each other. For example, the first base 10 may be a locking device of a case or a bag, and the inserting component 30 may be a zipper head of a zipper. However, it is not limited thereto, and the present invention may be applied in other fields.

Preferably, the first base 10 may be a casing or a cover, and the second base 20 may be a slider in said casing or a base under said cover. However, the configurations of the first base 10 and the second base 20 are not limited thereto.

The inserting component 30 may be inserted into the first base 10 in an engaging direction D1 so that the inserting component 30 is converted into a buckled state. The first base 10 and the second base 20 may be moved or rotated with respect to each other so that the inserting component 30 is converted into an unbuckled state. During conversion into the unbuckled state of the inserting component 30, the first base 10 may be static but the second base 20 may be moved or rotated; alternatively, the first base 10 may be moved or rotated but the second base 20 may be static.

Besides, when the inserting component 30 is converted into the unbuckled state via the first base 10 and the second base 20 moving or rotating with respect to each other, the inserting component 30 is not certainly ejected out of the first base 10. Instead, it may only cause the inserting component 30 to be moveable out of first base 10. The followings are several embodiments, in which the inserting component 30 will be ejected out of the first base 10 after the inserting component 30 is converted into the unbuckled state.

Please refer to FIGS. 1 and 2. In a first embodiment of the present invention, the first base 10 may be a casing and comprises an inner space, an inserting component receiver 11 and a second-base passage 12. In this embodiment, the inserting component receiver 11 is formed on a top surface of the first base 10 and the second-base passage 12 is formed on a side surface of the first base 10. Besides, in this embodiment, the first base 10 further comprises a foundation 13 and a cover 14, but it is not limited thereto.

Figure 7:
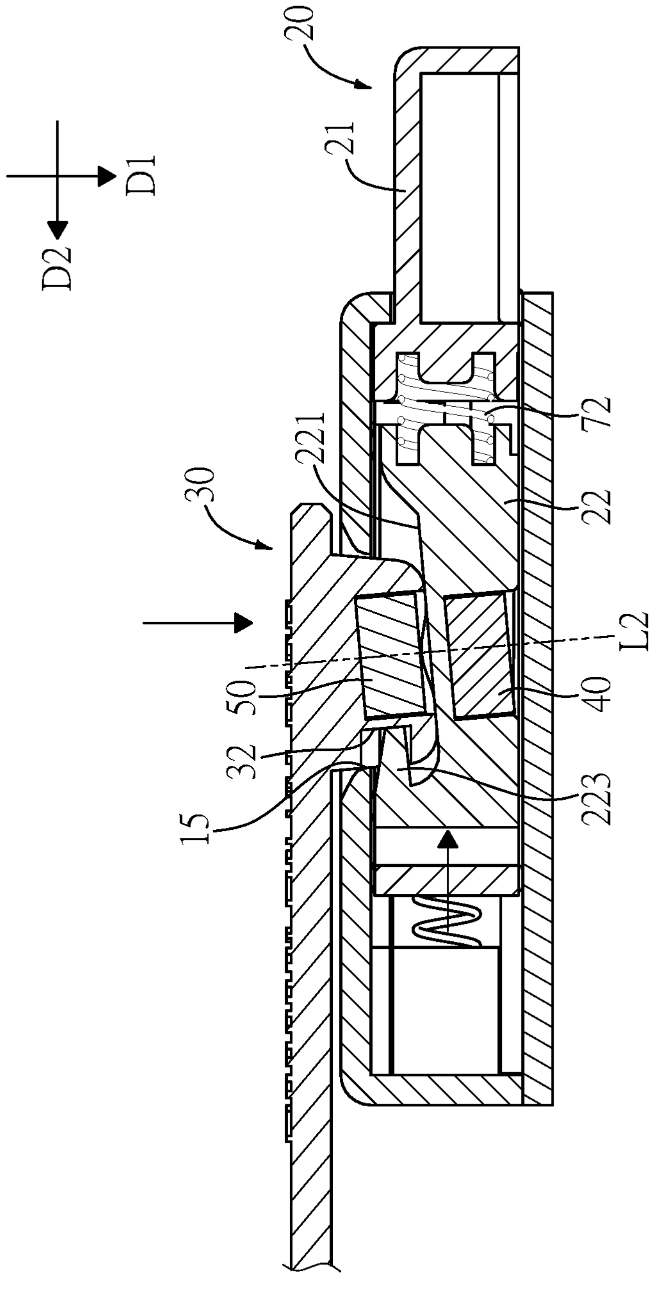
Figure 9:
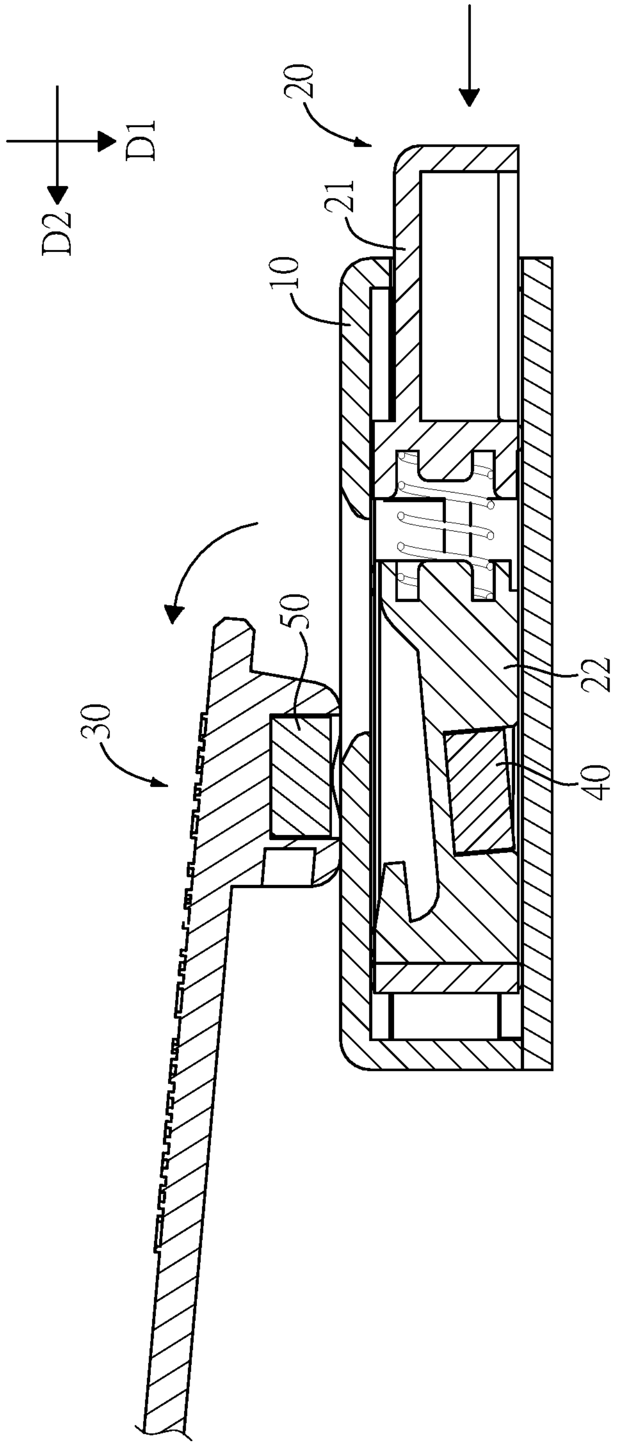

Then please refer to FIGS. 7 and 9. The inserting component 30 can be inserted into the first base 10 along the engaging direction D1 so that the inserting component 30 is converted into the buckled state (as shown in FIG. 7). The term "buckled state" means a state in which the inserting component 30 cannot be separated from the first base 10.

The second base 20 may be a slider and is movably mounted in the second-base passage 12 and in the first base 10. The inserting component 30 can be moved out of the first base 10 via the second base 20 moved along a disengaging direction D2 with respect to the first base 10 (as shown in FIG. 9). The disengaging direction D2 and the engaging direction D1 are different. Preferably, the disengaging direction D2 and the engaging direction D1 are perpendicular to each other, but it is not limited thereto.

Please refer to FIGS. 2 to 4 and 6. The first component 40 is mounted on the second base 20 and the second component 50 is mounted on the inserting component 30. When the inserting component 30 is moved close to the inserting component receiver 11 of the first base 10, a magnetic attraction force is generated between the second component 50 on the inserting component 30 and the first component 40 on the second base 20 which is in the first base 10. The magnetic attraction force may guide the inserting component 30. Therefore, the first base 10 may attract the inserting component 30 to approach close to the inserting component receiver 11 and the inserting component 30 is to be inserted into the inserting component receiver 11. In other words, the magnetic attraction force can assist in inserting the inserting component 30. After the inserting component 30 is inserted into the inserting component receiver 11, the magnetic attraction force between the components 40 and 50 can assist the inserting component 30 in maintaining the buckled state. One of the components 40 and 50 may be a magnet and the other one may be metal, or both components 40 and 50 are magnets. It is not limited thereto as long as the magnetic attraction force is generated. In this embodiment, the first component 40 is mounted in the second base 20. Further, even if the inserting component 30 is inserted into the first base 10, the first component 40 and the second component 50 are still spaced apart from each other. However, it is not limited thereto.

Besides, the first component 40 and the second component 50 may be an independent unit or each formed integrally with the respective element on which they are. For example, the first component 40 may be integral with the second base 20, which means the entire second base 20 or a part of the second base 20 is made of magnet or metal; the second component 50 may be integral with the inserting component 30, which means the entire inserting component 30 or a part of the inserting component 30 is made of magnet or metal.

Figure 8:
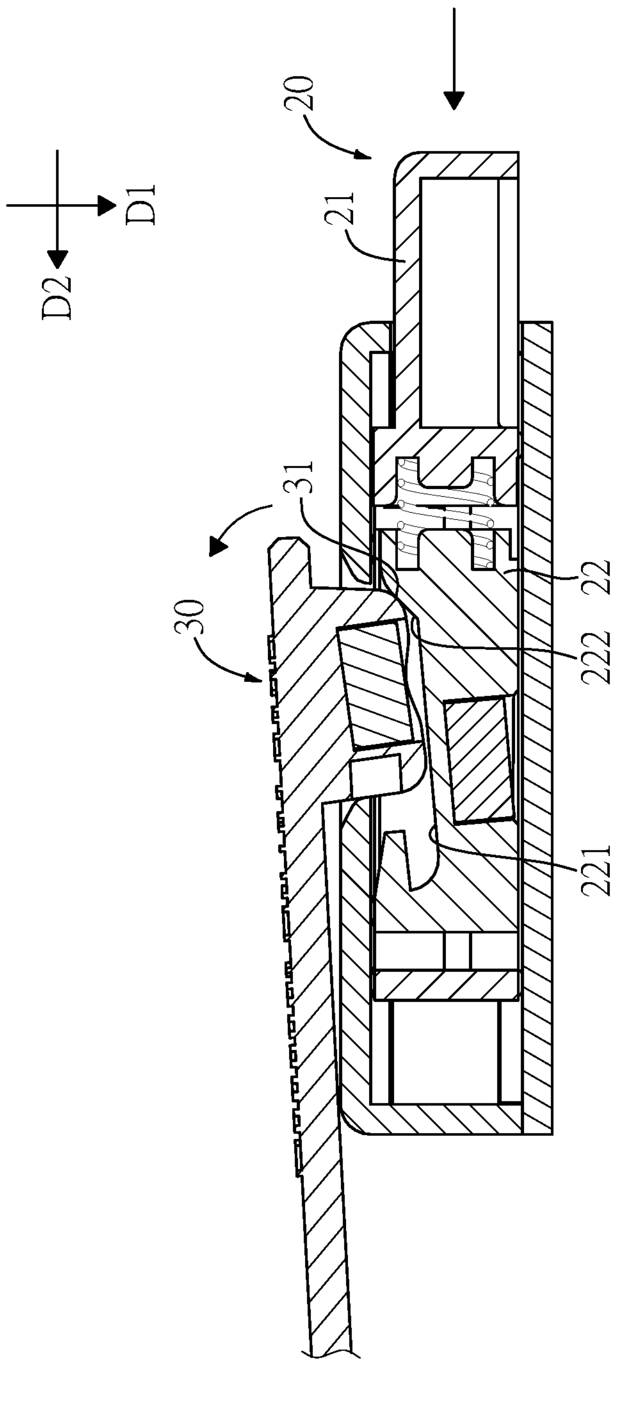

Please refer to FIGS. 7 to 9. The followings are details about how to eject the inserting component 30 out of the first base 10 via the second base 20 moved in the disengaging direction D2. In this embodiment, during movement of the second base 20 in the disengaging direction D2, the movement of the second base 20 will generate a force in an opposite direction of the engaging direction D1. Said force conflicts with the magnetic attraction force between the first component 40 and the second component 50, and thereby a side 31 of the inserting component 30 is lifted. Said side of the inserting component 30 is a side opposite the disengaging direction D2. With the inserting component 30 is lifted, an angle between the first component 40 and the second component 50 is changed (as shown in FIG. 8). Therefore, the magnetic attraction force between the first component 40 and the second component 50 becomes unbalanced, which makes the lifted inserting component 30 unstable. With the second base 20 is moved further, the first component 40 moved along with the second base 20 will pull the unstable inserting component 30 via the magnetic attraction force, and thereby a torque is generated on the inclined inserting component 30. When the second base 20 is moved to a terminal end, the inserting component 30 is pushed out of the first base 10 via the pushing force for moving the second base 20 and the torque from the magnetic attraction force. In other words, the pushing force for moving the second base 20 assists with moving the inserting component 30 out of the first base 10. However, the way to eject the inserting component 30 via moving the second base 20 is not limited thereto.

Moreover, please refer to FIGS. 2, 7, and 8. The followings are details about how to generate a force along an opposite direction of the engaging direction D1 via moving the second base 20. In the first embodiment, the second base 20 comprises an abutting surface 221 and a tilting-abutting portion 222. The tilting-abutting portion 222 is protruded from the abutting surface 221. In this embodiment, the tilting-abutting portion 222 is a bump with an inclined surface, but the shape is not limited thereto. When the second base 20 is moving along the disengaging direction D2, the tilting-abutting portion 222 will push the side 31 of the inserting component 30 in the opposite direction of the engaging direction D1, and said side 31 faces toward an opposite direction of the disengaging direction D2. Therefore, the side 31 of the inserting component 30 is lifted and the angle between the first component 40 and the second component 50 is changed. However, how to push is not limited thereto.

Figure 6:
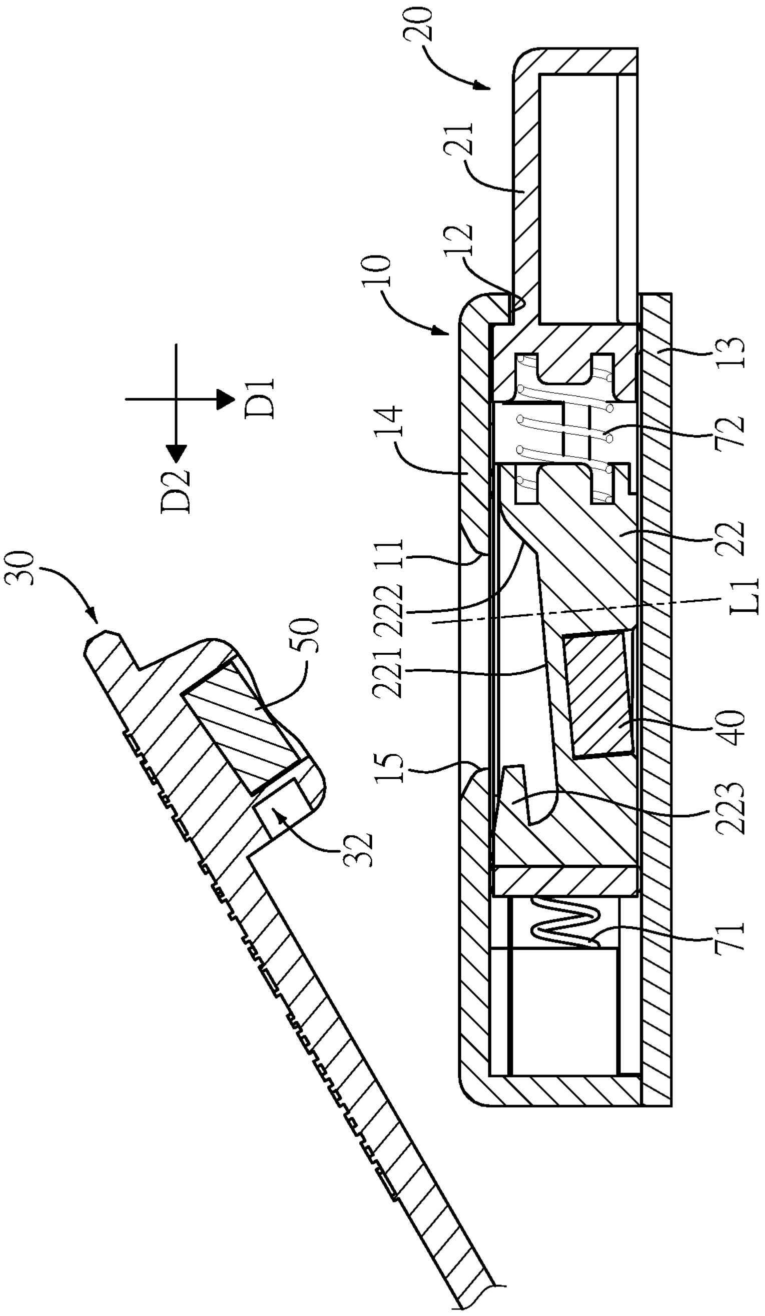
FIGS. 6 to 9 are operational side sectional views of the magnetic buckle device in FIG. 1.
Figure 10:
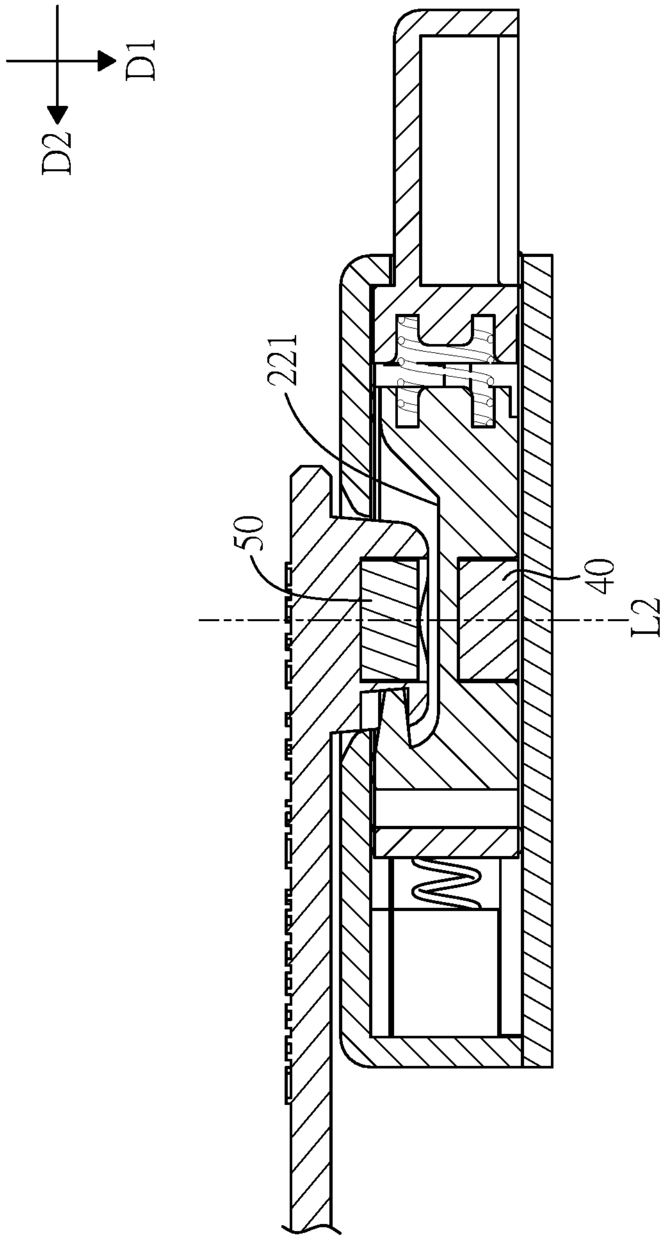
FIG. 10 is a side sectional view of the magnetic buckle device in accordance with another embodiment of the present invention.

Moreover, in this embodiment, a normal L1 of the abutting surface 221 of the second base 20 is non-perpendicular to the disengaging direction D2 (as shown in FIG. 6). Therefore, when the present invention is buckled via the inserting component 30 inserted into the first base 10 along the engaging direction D1, the inserting component 30 has an end located in the first base 10 and said end may contact the abutting surface 221 of the second base 20. When the second base 20 is pushed along the disengaging direction D2, the inserting component 30 may be lifted along with the inclined abutting surface 221, thereby assisting in ejecting the inserting component 30 out of the first base 10. However, it is not limited thereto; as shown in FIG. 10, the abutting surface 221 may be a horizontal surface.

Please refer to FIGS. 7 to 9. In this embodiment, when the inserting component 30 is moved out of the first base 10 along with the moving of the second base 20, the first component 40 may be moved along with the second base 20, too. Then, the magnetic attraction force between the first component 40 and the second component 50 may provide a horizontal component, so the inserting component 30 is moved out of the first base 10 obliquely (as shown in FIG. 9). After the inserting component 30 is ejected completely, the magnetic attraction force between the first component 40 and the second component 50 still draws the inserting component 30, so the inserting component 30 is still attracted toward the first component 40 and abuts the first base 10. With the inserting component 30 is moved obliquely, the chance that the inserting component 30 is fully ejected out of the first base 10 is increased. Besides, with the inserting component 30 moved obliquely, the inserting component 30 is prevented from inserting back into the first base 10 immediately after the inserting component 30 is ejected out of the first base 10. However, it is not limited thereto; in another embodiment, the inserting component 30 may be ejected in a non-inclined manner, but simply in the opposite direction of the engaging direction D1.

Furthermore, in this embodiment, as shown in FIG. 2 and FIG. 7, a stopping portion 15 is mounted on the first base 10. Preferably, the stopping portion 15 is formed on a wall of the inserting component receiver 11. When the second base 20 is moved in the disengaging direction D2, the stopping portion 15 will abut the inserting component 30, which prevents the inserting component 30 from moving in the disengaging direction D2 along with the second base 20. Therefore, the inserting component 30 may not be moved immediately along with the second base 20 by the magnetic attraction force from the moving first component 40; instead, after the inserting component 30 is lifted by the inclined abutting surface 221 to a predetermined height or the inserting component 30 is pushed (for example, by the tilting-abutting portion 222) until the side 31 of the inserting component 30 is lifted, the inserting component 30 may suddenly cross over the stopping portion 15 and then be ejected obliquely out of the first base 10. Since the inserting component 30 is not moved along with the second base 20 but instead ejected suddenly after the second base 20 has moved for a certain period, the inserting component 30 may be popping out. Besides, in the embodiment that the inserting component 30 is moved out of the first base 10 simply in the opposite direction of the engaging direction D1, the stopping portion 15 is capable of keeping the inserting component 30 from deviating during the movement.

Furthermore, as shown in FIG. 7, when the present invention is buckled via the inserting component 30 inserted into the first base 10 along the engaging direction D1, the first component 40 and second component 50 are parallel with each other and a centerline L2 of the first component 40 is non-perpendicular to the disengaging direction D2. In other words, both the first component 40 and the second component 50 are inclined in an oblique moving-out direction of the inserting component 30, which assists with ejecting the inserting component 30 obliquely moved out via the magnetic attraction force. However, it is not limited thereto; as shown in FIG. 10, the centerline L2 of the first component 40 may be perpendicular to the disengaging direction D2.

Figure 5:
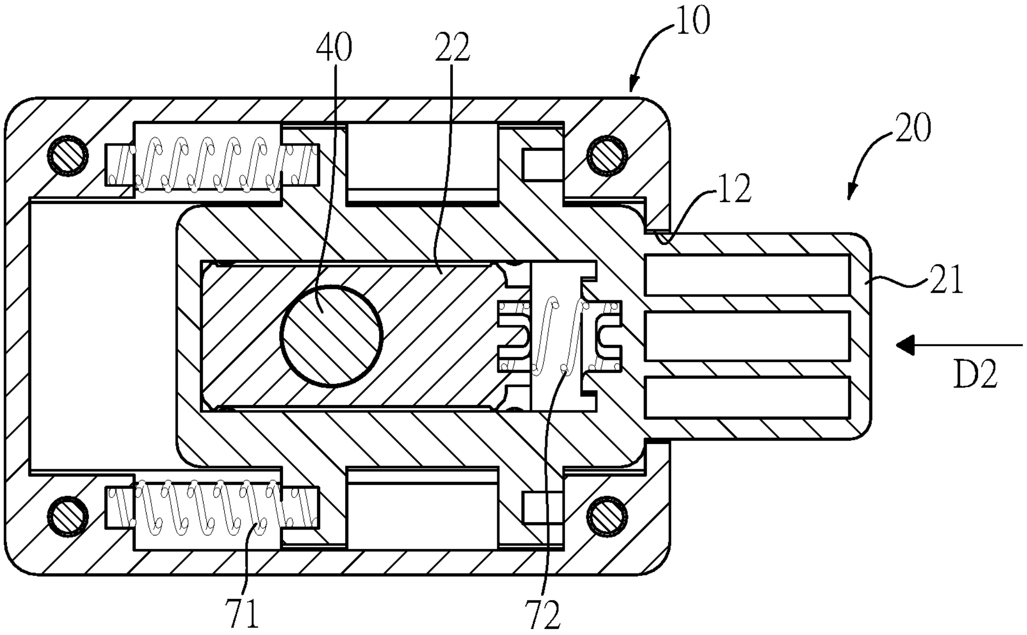
FIG. 5 is a top plan sectional view of the magnetic buckle device in FIG. 1.

Besides, in this embodiment, as shown in FIGS. 2, 3, and 5, the magnetic buckle device of the present invention further comprises at least one second-base elastic component 71 mounted between the first base 10 and the second base 20. The at least one second-base elastic component 71 is configured to push the second base 20 toward the opposite direction of the disengaging direction D2. Therefore, after the user stops to force the second base 20 because the inserting component 30 is ejected out completely, the second-base elastic component 71 will push back the second base 20 to its original position. In this embodiment, the amount of the second-base elastic component 71 may be two, and the second base 20 is located between the two second-base elastic components 71. However, it is not limited thereto; the magnetic buckle device of the present invention may not have any second-base elastic component 71 and the user may manually operate the second base 20 to restore to its original position.

Besides, in this embodiment, as shown in FIGS. 2 to FIG. 5, the second base 20 further comprises a base body 21 and a displacement component 22. The base body 21 protrudes out of the second-base passage 12 of the first base 10. The base body 21 is a part of the second base 20 and is configured to be pushed by the user. The second-base elastic components 71 also push the base body 21. The displacement component 22 is movably mounted in the base body 21 in the disengaging direction D2. The displacement component 22 is a part of the second base 20 and corresponds to the inserting component 30. The first component 40 is mounted on the displacement component 22. Both the abutting surface 221 and the tilting-abutting portion 222 are formed on the displacement component 22. Therefore, when the inserting component 30 is inserted into the first base 10, the magnetic attraction force between the first component 40 and the second component 50 makes an engaging portion 223 of the displacement component 22 move in the opposite direction of the disengaging direction D2 to engage with an engaging recess 32 of the inserting component 30, which converts the inserting component 30 into the buckled state. Thus, before the inserting component 30 is inserted into the inserting component receiver 11 of the first base 10, the engaging portion 223 of the displacement component 22 will not be located in the moving path of the inserting component 30, so that the movement may not confront any obstacle and thereby the user may insert the inserting component 30 more easily.

Figure 11:
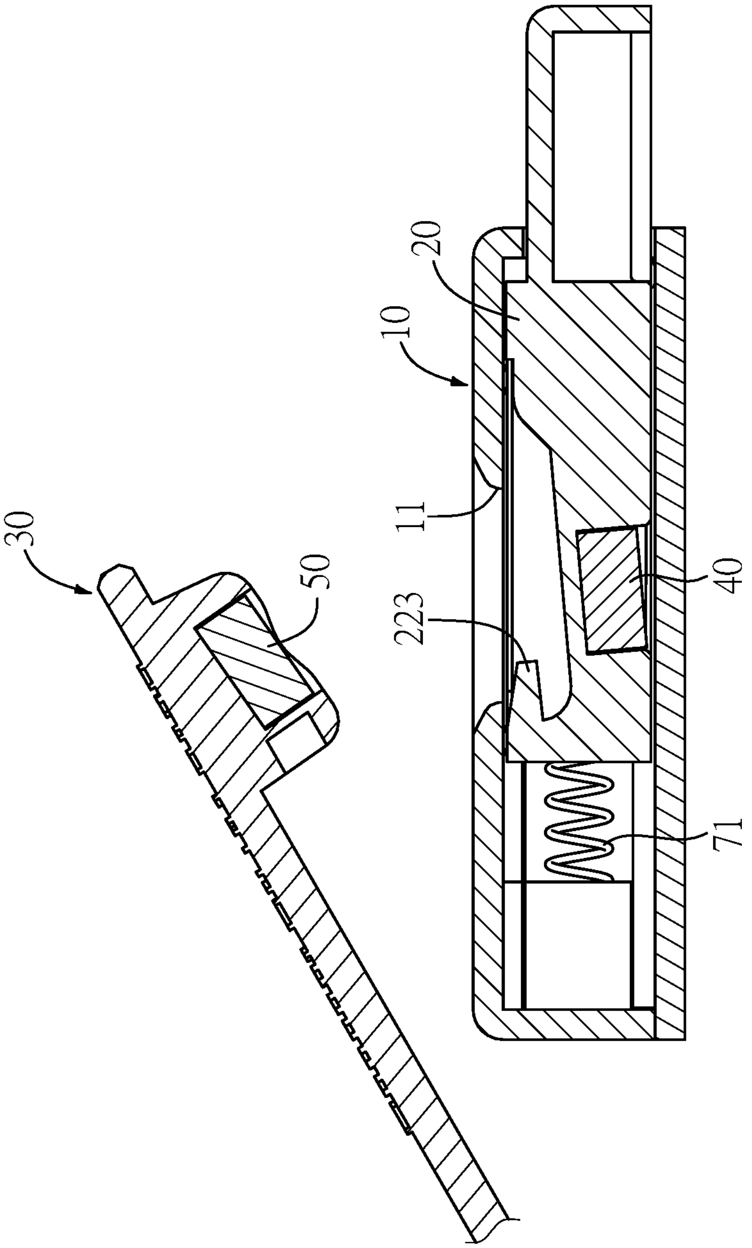
FIG. 11 is a side sectional view of the magnetic buckle device in accordance with still another embodiment of the present invention.
Figure 12:
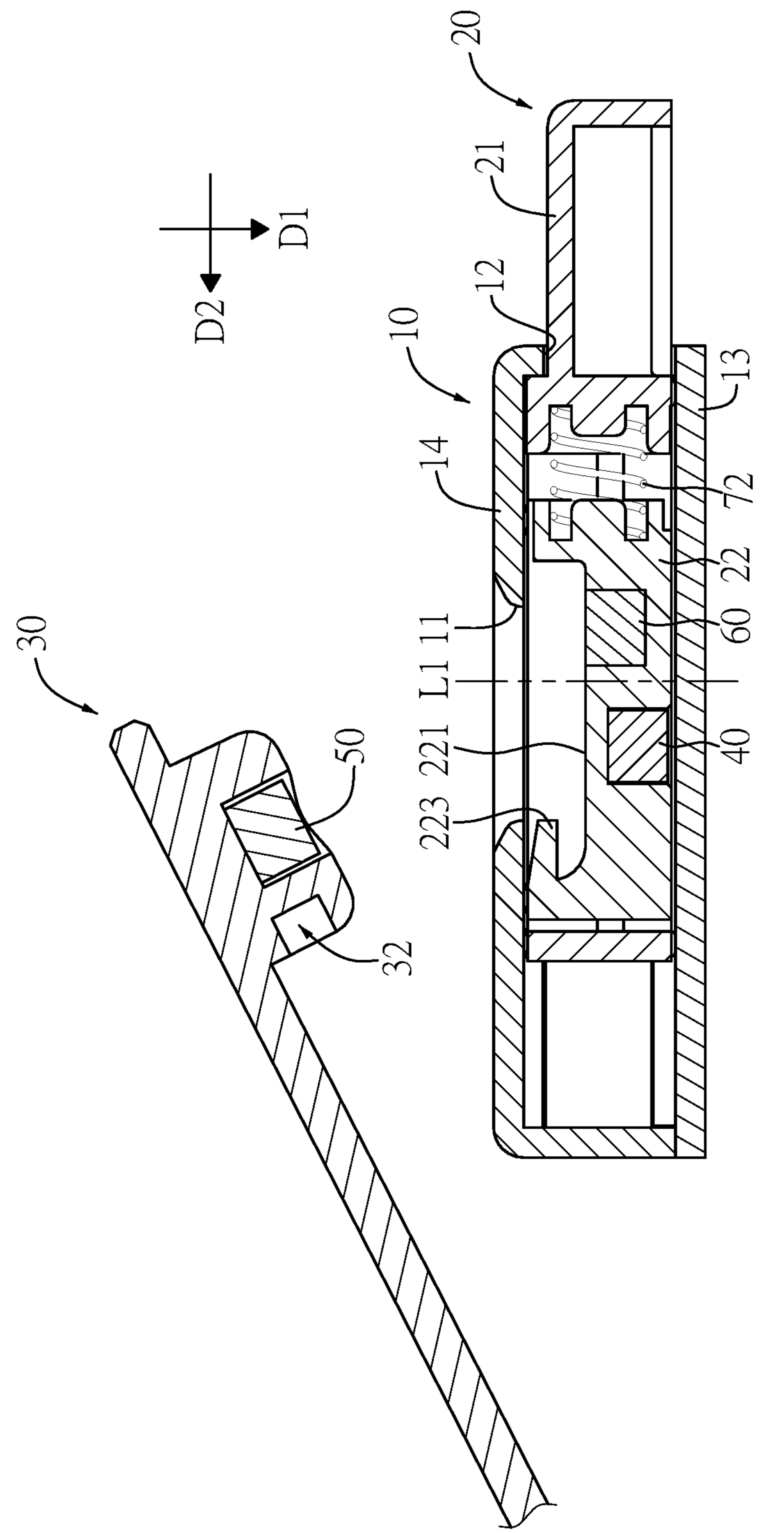
FIGS. 12 to 15 are operational side sectional views of the magnetic buckle device in accordance with a second embodiment of the present invention.
Figure 13:
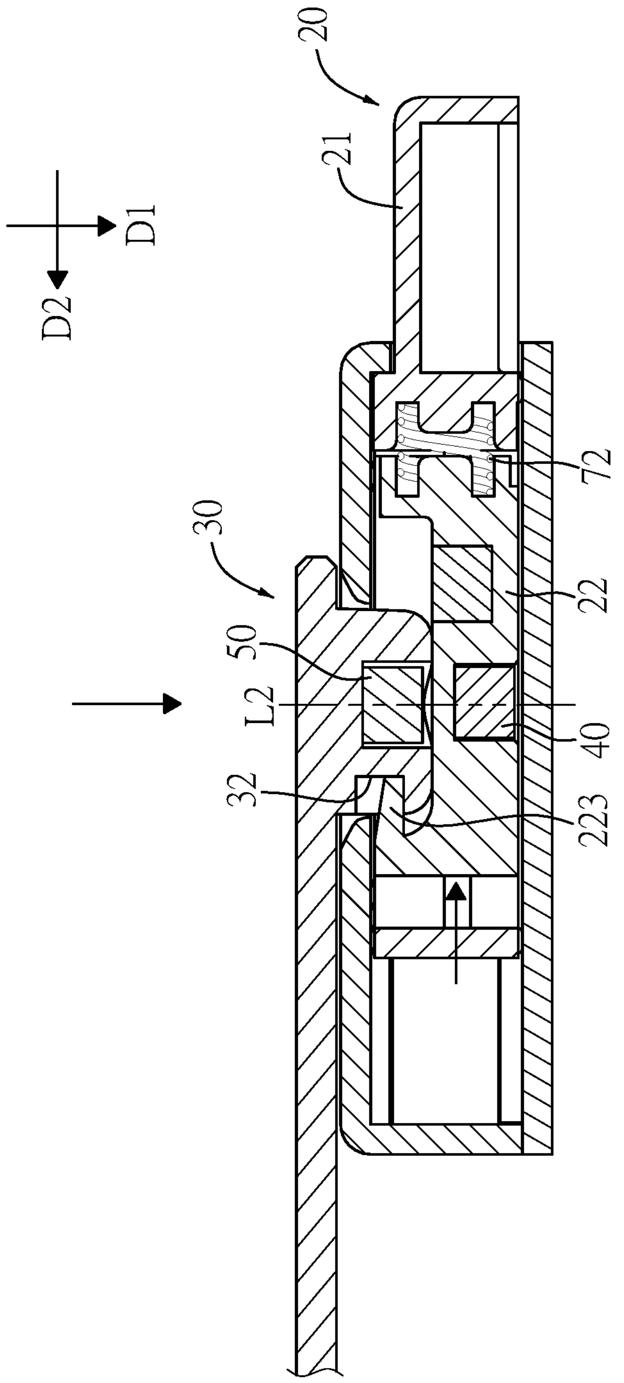
Figure 14:
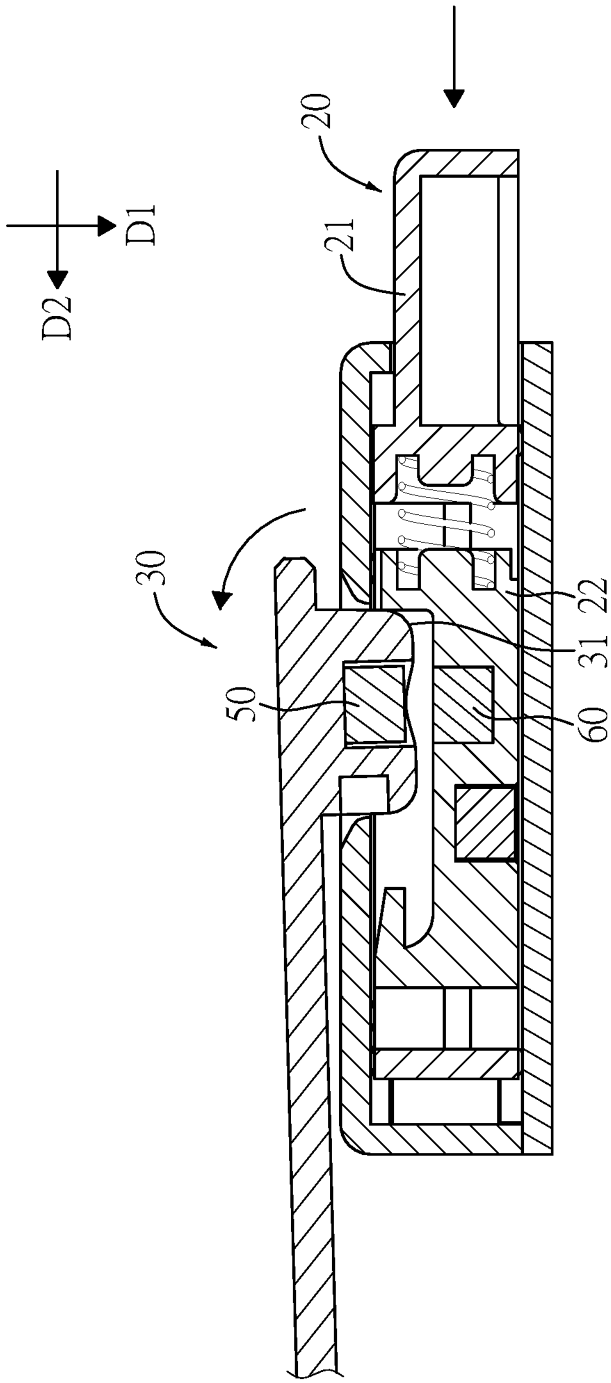
Figure 15:
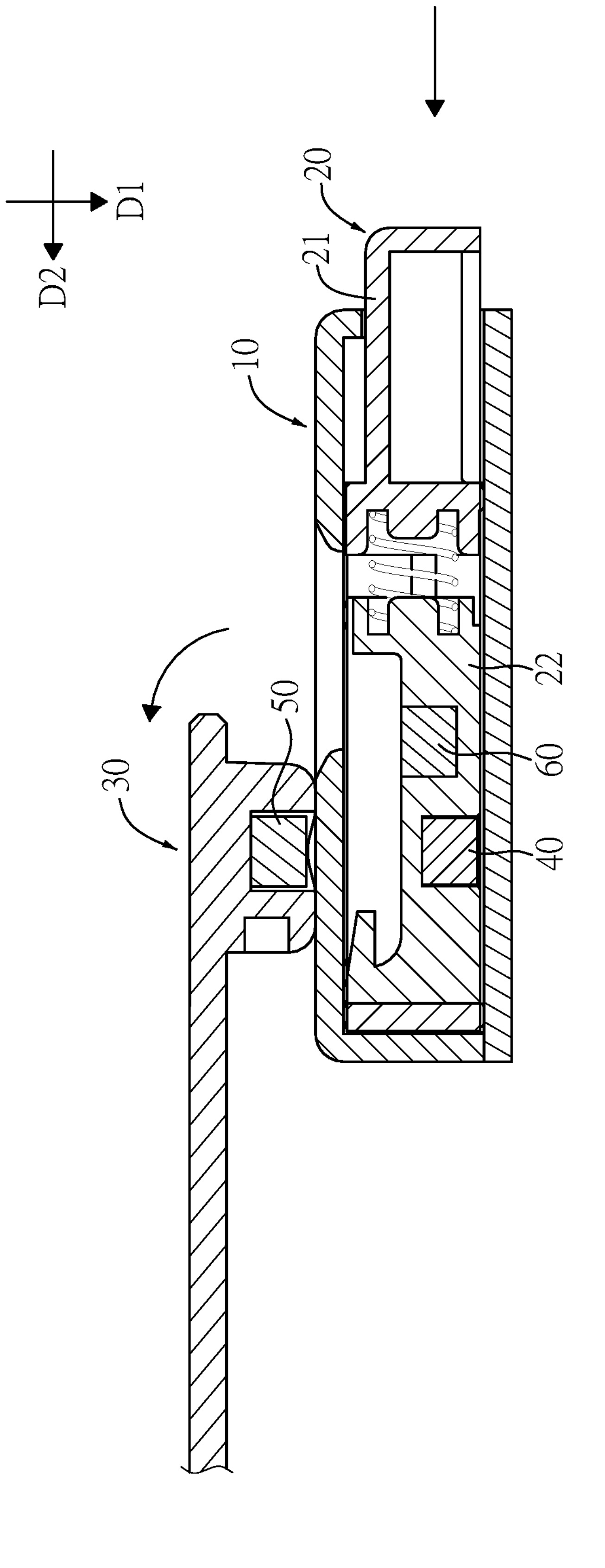
Figure 16:
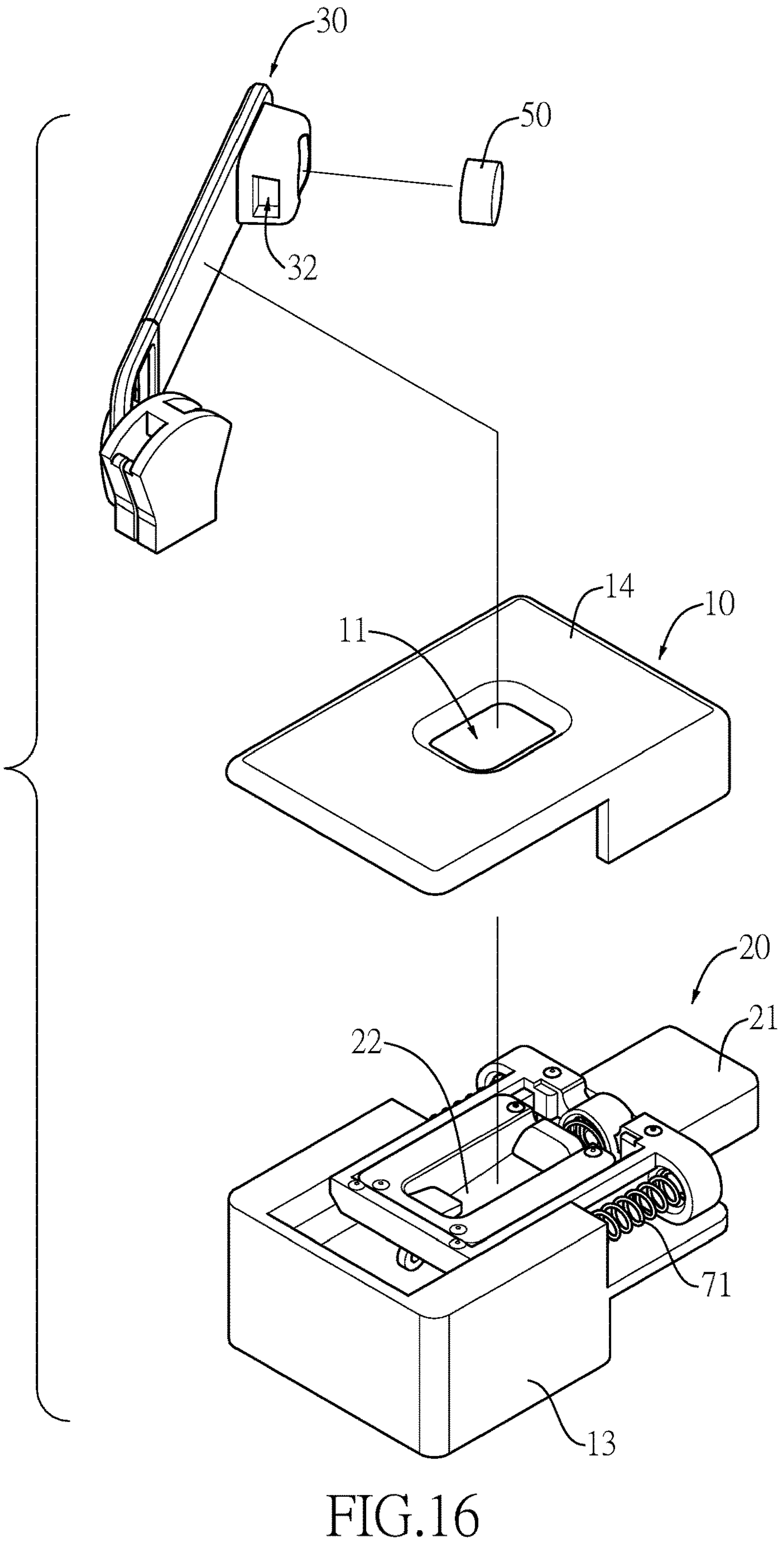
FIGS. 16 to 18 are exploded views of the magnetic buckle device in accordance with a third embodiment of the present invention.

Please refer to FIG. 11; in another embodiment, the second base 20 may not be divided into the base body 21 and the displacement component 22. In other words, the second base 20 is formed integrally. In such embodiment, before the inserting component 30 is inserted into the inserting component receiver 11 of the first base 10, the engaging portion 223 of the displacement component 22 may be located in the moving path of the inserting component 30. Thus, when the user inserts the inserting component 30, not only the engaging portion 223 but the entire second base 20 should be pushed away by the inserting component 30 or the user pushes the second base 20 manually. After the inserting component 30 is inserted completely, the second-base elastic component 71 and the magnetic attraction force between the first component 40 and the second component 50 collaboratively move the second base 20, which makes the engaging portion 223 engage the inserting component 30. In such embodiment, the magnetic buckle device may be less convenient than the earlier-mentioned embodiment, but may be applied in a device that should not be locked too easily. Nevertheless, the magnetic buckle device in accordance with such embodiment still has the magnetic attraction force between the first component 40 and the second component 50 for guiding the insertion of the inserting component 30.

Besides, as shown in FIGS. 3, 5, and 6, in the embodiment that the second base 20 comprises the base body 21 and the displacement component 22, the second base 20 may further comprise a displacement-component elastic component 72 mounted between the base body 21 and the displacement component 22. The displacement-component elastic component 72 may push the displacement component 22 toward the disengaging direction D2 with respect to the base body 21. Therefore, after the inserting component 30 is moved out, the displacement-component elastic component 72 will push the displacement component 22 back to its original position automatically. However, it is not limited thereto; the second base 20 may not have the displacement-component elastic component 72 and thus the user manually pushes the second base 20 back to its original position.

As a result, as shown in FIGS. 6 to 9, with the first component 40 mounted on the second base 20 and the second component 50 on the inserting component 30 and the magnetic attraction force generated therebetween, when the inserting component 30 is close to the inserting component receiver 11 of the first base 10, the magnetic attraction force between the first component 40 and the second component 50 will guide the inserting component 30, so that the inserting component 30 tends to get close to the inserting component receiver 11 and move into inserting component receiver 11, which assists in inserting the inserting component 30.

Then, when the inserting component 30 is inserted completely, the magnetic attraction force between the first component 40 and the second component 50 will move the displacement component 22 and thus the engaging portion 223 is engaged with the inserting component 30, which accomplishes the buckled state. In other words, the user does not need to deliberately exert force to finish the buckling.

Thus, with the magnetic attraction force between the first component 40 and the second component 50, the inserting component 30 is guided during the inserting and the force from the user is saved, so it is more convenient.

Please refer to FIGS. 12 to 15 or FIGS. 20 to 22. In a second embodiment and a third embodiment, a magnetic unlocking mechanism is provided and configured to generate a force to move the second base 20 in the opposite direction of the engaging direction D1. The magnetic unlocking mechanism is mounted on the second base 20. When the magnetic unlocking mechanism moves the second base 20 in the disengaging direction D2, the magnetic unlocking mechanism generates a magnetic repulsion force toward the second component 50 to eject the inserting component 30.

How to eject the inserting component 30 may be mainly achieved by another mechanism (e.g. the tilting-abutting portion 222 or the inclined abutting surface 221 described later), and the magnetic unlocking mechanism is configured to assist in ejecting the inserting component 30. However, how to eject the inserting component 30 may be achieved by the magnetic unlocking mechanism only and without another mechanism.

In an embodiment that a pushing force is generated by the magnetic unlocking mechanism, the inserting component 30 may be pushed out of the first base 10 obliquely as described in the earlier-mentioned embodiment, and the inserting component 30 may keep in contacting the first base 10 because of the magnetic attraction force between the first component 40 and the second component 50.

Please refer to FIGS. 12 to 15. In a first configuration, the magnetic unlocking mechanism includes a third component 60. The third component 60 is mounted on the second base 20. A magnetic repulsion force is generated between the third component 60 and the second component 50 on the inserting component 30. In other words, the first component 40 on the second base 20 and the second component 50 on the inserting component 30 are attracted to each other, but the third component 60 on the second base 20 and the second component 50 on the inserting component 30 are repulsed against each other. Therefore, both the third component 60 on the second base 20 and the second component 50 on the inserting component 30 may be magnets, but the first component 40 on the second base 20 may be either metal or magnet.

When the second base 20 is moved in the disengaging direction D2, the magnetic attraction force between the first component 40 on the second base 20 and the second component 50 on the inserting component 30 may drive the inserting component 30 to move in the disengaging direction D2 together, but the inserting component 30 is restricted by a wall of the inserting component receiver 11, which makes the inserting component 30 unable to move. Therefore, the first component 40 on the second base 20 is moved away from the second component 50 on the inserting component 30, so the magnetic attraction force becomes weaker gradually. At the same time, the third component 60 on the second base 20 is moved close to the second component 50, so the magnetic repulsion force becomes stronger gradually. Then, the increasing magnetic repulsion force is configured to eject the inserting component 30. Precisely, along with the movement of the second base 20, a side, facing toward the first component 40, of the second component 50 is under the magnetic attraction force but a side, facing toward the third component 60, of the second component 50 is under the magnetic repulsion force, which makes a side, facing toward the third component 60, of the inserting component 30 lifted gradually (said side of the inserting component 30 is a side opposite the side 31). Therefore, the angle between the second component 50 on the inserting component 30 and the first component 40 is changed, and an angle between the second component 50 on the inserting component 30 and the third component 60 is changed, too, which makes the magnetic forces therebetween unbalanced and the oblique inserting component 30 unstable. Then, when a distance between the third component 60 and the second component 50 is decreased to lower than a predetermined length and the magnetic repulsion force is increased to higher than a predetermined intensity, the magnetic repulsion force will drive the inserting component 30 to cross over the wall of the inserting component receiver 11 and move obliquely out of the first base 10. As a result, the inserting component 30 is not moved along with the second base 20, but instead ejected out suddenly after the second base 20 has been moved for a certain period, which allows the inserting component 30 to pop out of the first base 10.

Please refer to FIGS. 16 to 19; in a second configuration, the magnetic unlocking mechanism comprises a tilting component 80. The tilting component 80 is pivotally mounted on the second base 20 and connected with the first base 10. The first component 40 is mounted on the tilting component 80. When the second base 20 is moved in the disengaging direction D2, the tilting component 80 may be tilted with respect to the second base 20. The first component 40 is also tilted along with the tilting component 80 and then a magnetic repulsion force is generated between the first component 40 and the second component 50 for ejecting the inserting component 30.

In a preferred embodiment, an edge of the tilting component 80 is pivotally mounted on a bottom surface of the second base 20, so the tilting component 80 may be tilted upward and selectively abut the bottom surface of the second base 20 along with the moving of the second base 20, but it is not limited thereto. Preferably, in a process that the second base 20 does not undergo any external force until the second base 20 is moved to an innermost end of a stroke of the second base 20 in the disengaging direction D2 under an external force, a rotating angle of the tilting component 80 is equal to or larger than 90 degrees; in this embodiment, the rotating angle is 90 degrees, but it is not limited thereto.

Besides, in this embodiment, when the second base 20 does not undergo any external force, the tilting component 80 is tilted upward until abutting the bottom surface of the second base 20. When the tilting component 80 abuts the bottom surface of the second base 20, the first component 40 on the tilting component 80 and the second component 50 on the inserting component 30 are attracted by each other, which assists in keeping the inserting component 30 in the buckled state. However, it is not limited thereto. In another embodiment, the second base 20 may be tilted to abut the bottom of the second base 20 because of an external force, and when the second base 20 does not undergo any external force, the tilting component 80 does not abut the bottom of the second base 20 but an orientation of the tilting component 80 allows the first component 40 and the second component 50 on the inserting component 30 to be attracted to each other, which achieves the same function.

Figure 17:
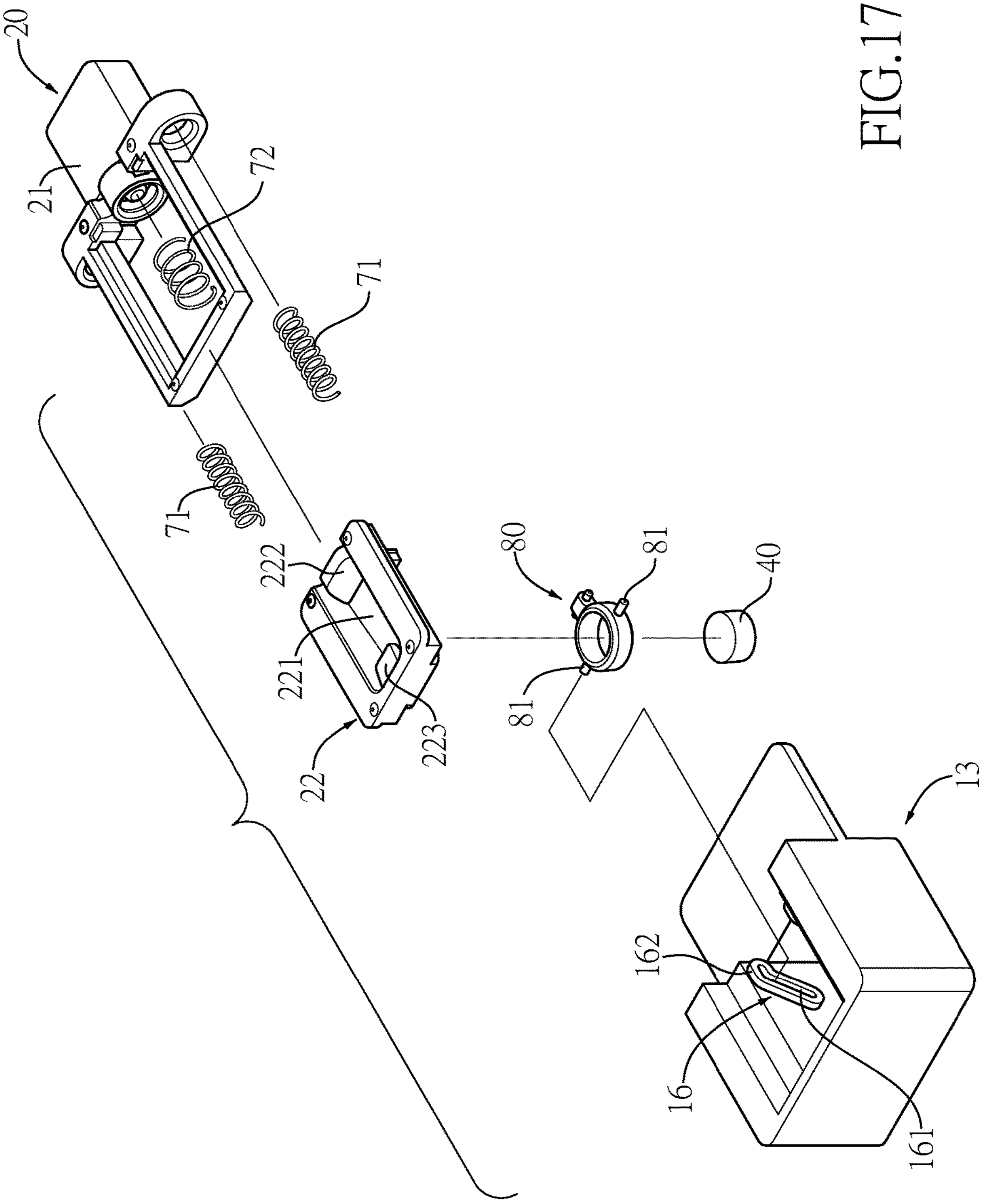
Figure 18:
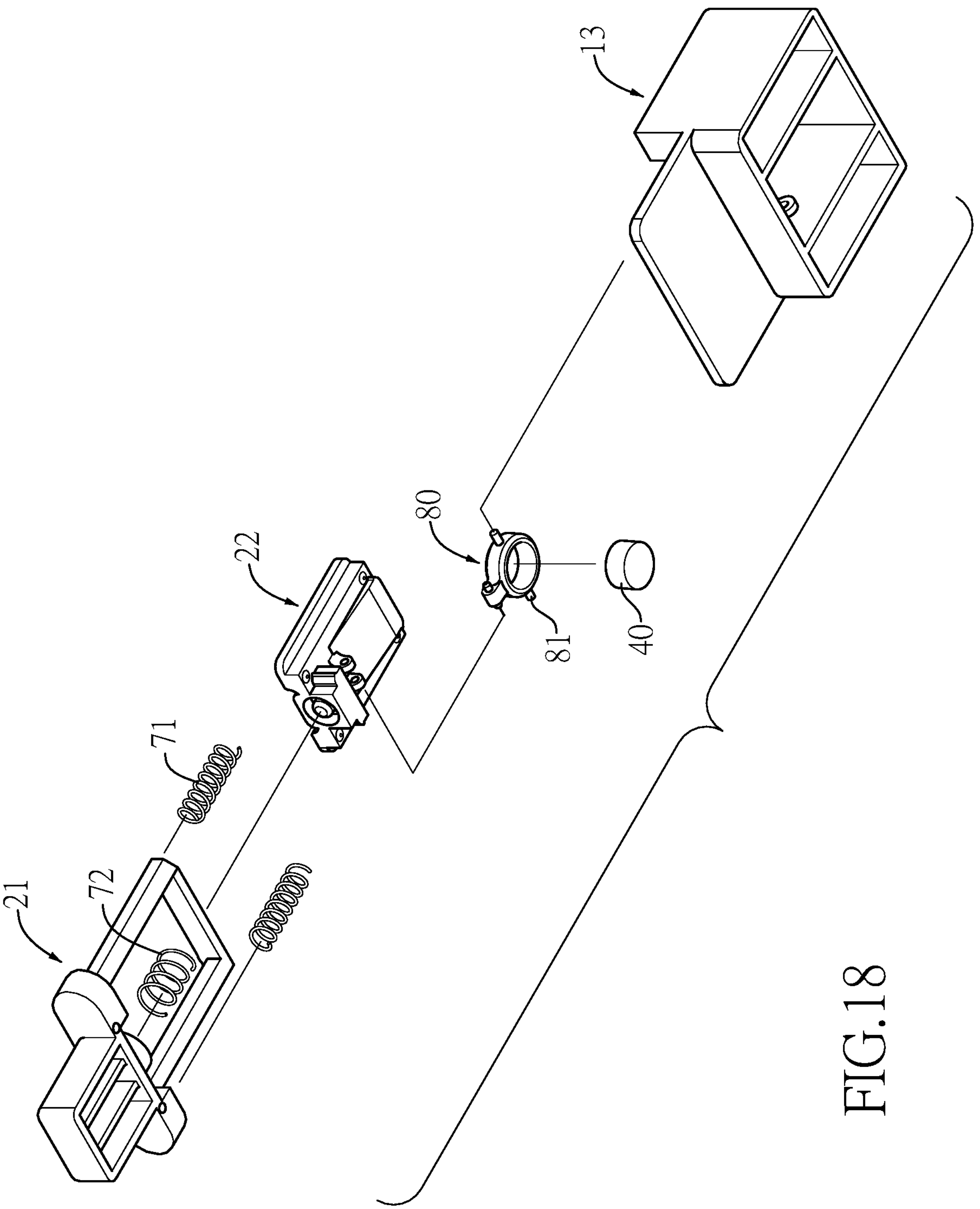
Figure 19:
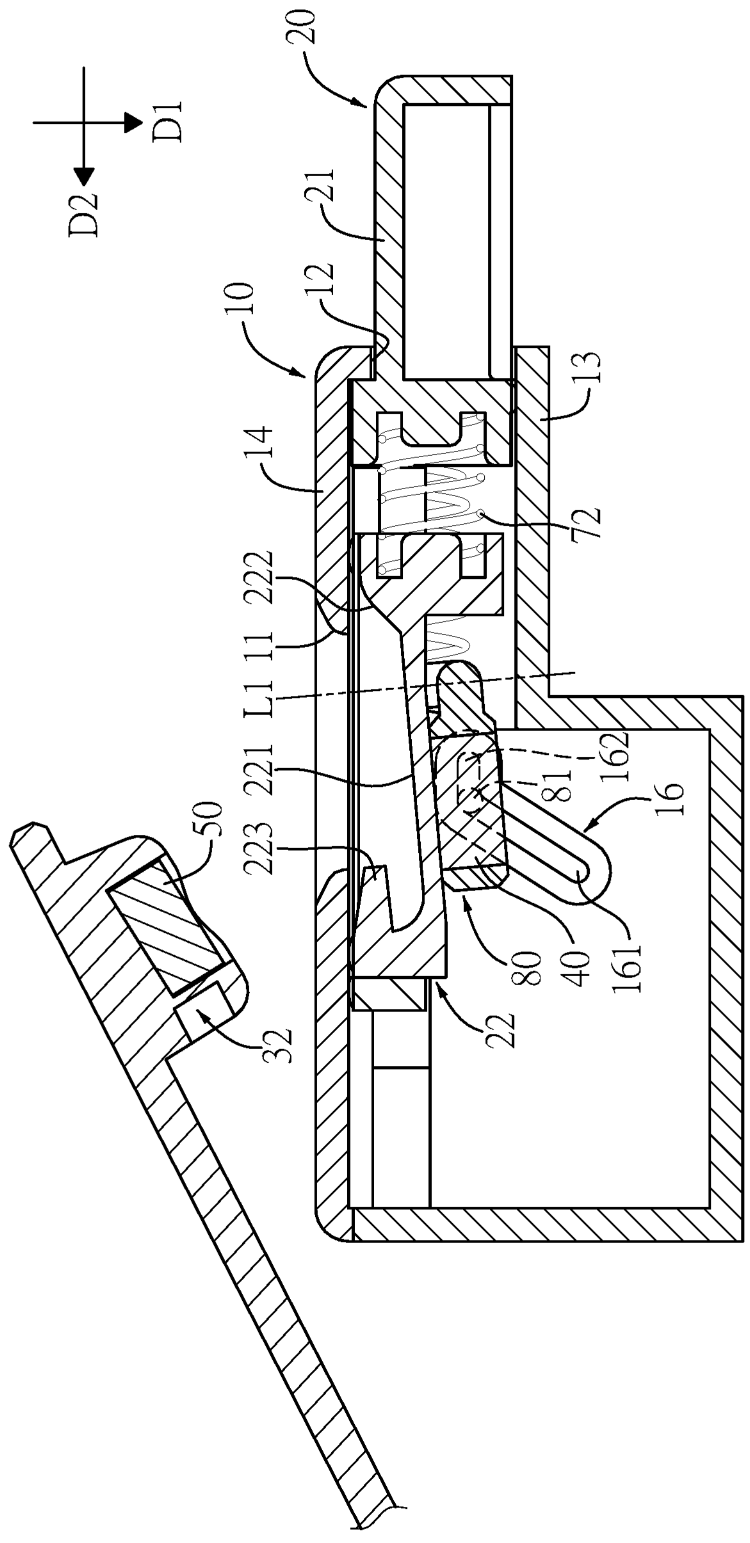
FIGS. 19 to 22 are operational side sectional views of the magnetic buckle device in accordance with the third embodiment.

Moreover, the followings are two mechanisms for tilting the tilting component 80 with respect to the second base 20 along with the moving of the second base 20:

Please refer to FIGS. 17 to 19; in the first embodiment of the tilting component 80, the first base 10 has two inner surfaces facing each other and two guiding portions 16 respectively mounted on the two inner surfaces. The two opposite sides of the tilting component 80 respectively abut the two guiding portions 16. When the second base 20 is moved in the disengaging direction D2, the tilting component 80 moved along with the second base 20 may be driven to tilt by the two guiding portions 16. Preferably, each one of the guiding portions 16 may be an elongated groove, and the tilting component 80 has two abutting rods 81. The abutting rods 81 protrude out from two opposite surfaces of the tilting component 80 respectively and are mounted in the two guiding portions 16, and thereby the tilting component 80 can be tilted by the guiding portions 16.

Besides, as shown in FIGS. 19 to 22, in this embodiment, a track of each guiding portion 16 has a tilting section 161 and an engaging section 162 connected with each other. Both the tilting section 161 and the engaging section 162 are straight. The engaging section 162 is parallel with the disengaging direction D2 but the tilting section 161 is not. Therefore, when the abutting rods 81 of the tilting component 80 are moved in the tilting sections 161, the tilting component 80 is tilted with respect to the second base 20 about a shaft with which the tilting component 80 is pivoted on the second base 20.

Figure 22:
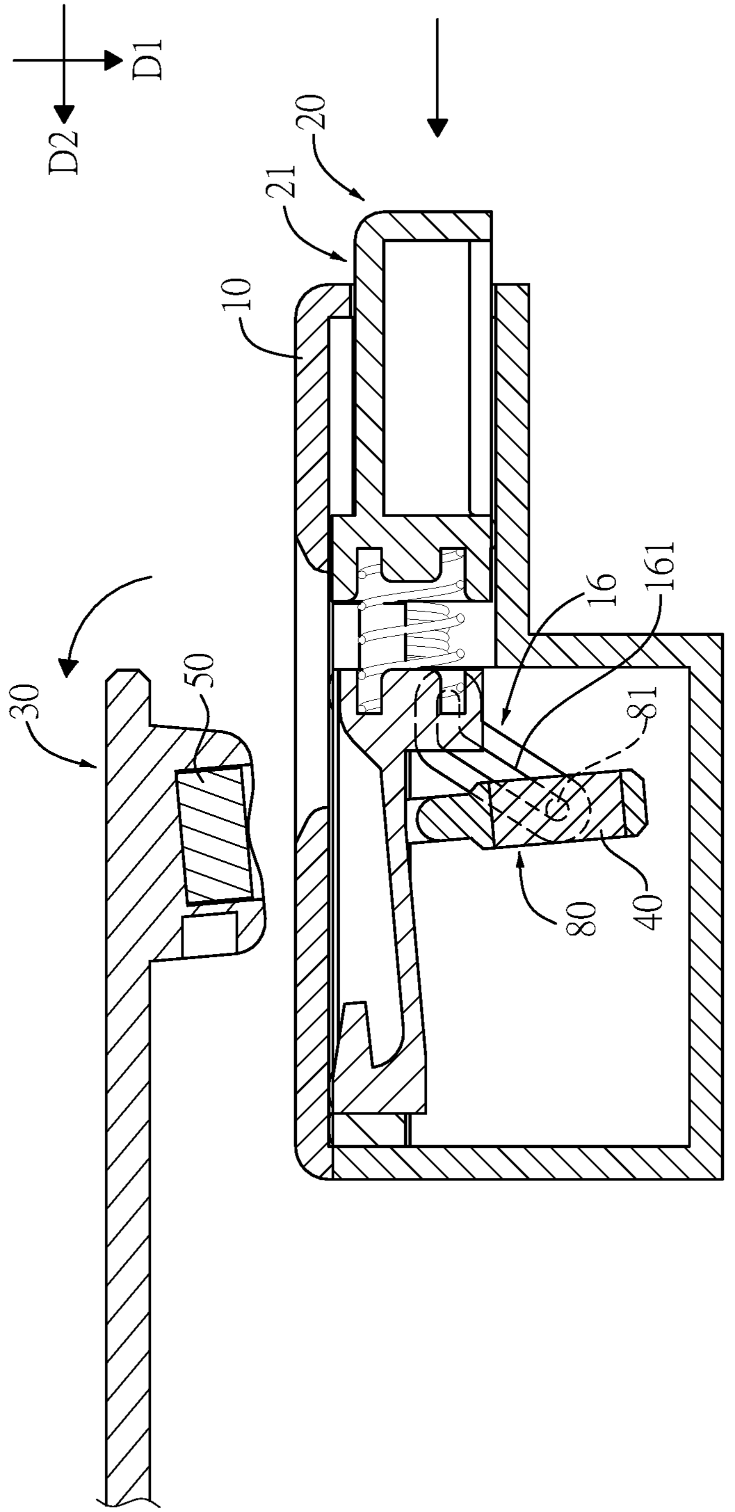

Preferably, as shown in FIG. 19, when the second base 20 does not undergo any external force and the inserting component 30 is not inserted into the first base 10, the abutting rods 81 of the tilting component 80 are located at ends of the tilting sections 161, and the tilting component 80 abuts the bottom of the second base 20. As shown in FIG. 22, when the abutting rods 81 of the tilting component 80 are moved to another ends of the tilting sections 161, the tilting component 80 is tilted by 90 degrees, and thereby the magnetic repulsion force is generated between the first component 40 on the tilting component 80 and the second component 50 on the inserting component 30 for ejecting the inserting component 30.

Figure 23:
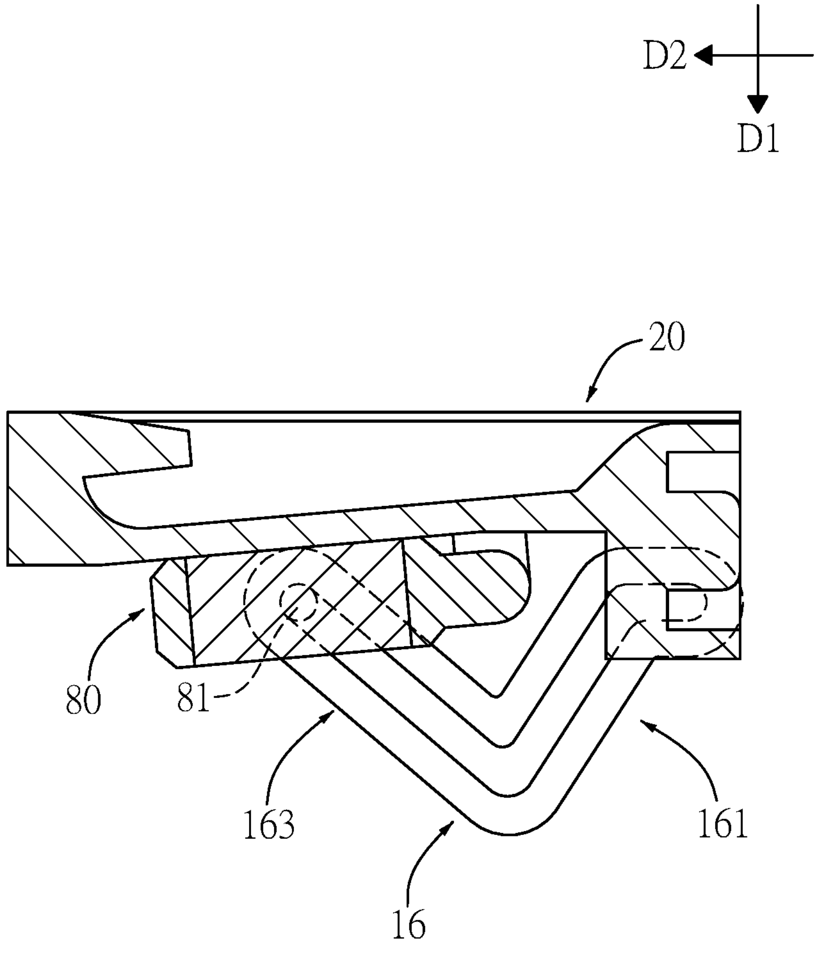
FIG. 23 is a side view of a tilting component of the magnetic buckle device in another configuration.

Furthermore, as shown in FIG. 23, in another embodiment, the tracks of the guiding portions 16 may be extended longer. Therefore, after the inserting component 30 is moved out of the first base 10, the tilting component 80 will be tilted with respect to the second base 20 if the second base 20 is moved in the disengaging direction D2 further. Then, because the first component 40 is tilted along with the tilting component 80, the magnetic attraction force is generated between the first component 40 and the second component 50, the inserting component 30 abuts the first base 10. Precisely, the track of each guiding portion 16 further comprises a tilting section 163. The tilting section 163 is connected with the tilting section 161 and thus the tilting section 163 and the tilting section 161 form a V-shape together. Therefore, the tilting component 80 is tilted to abut the bottom of the second base 20 and the inserting component 30 also abuts the first base 10.

The shapes of the tracks of the guiding portions 16 and the tilting angle of the tilting component 80 are not limited thereto and can be modified as needed.

The function of the engaging section 162 will be described later.

Figure 24:
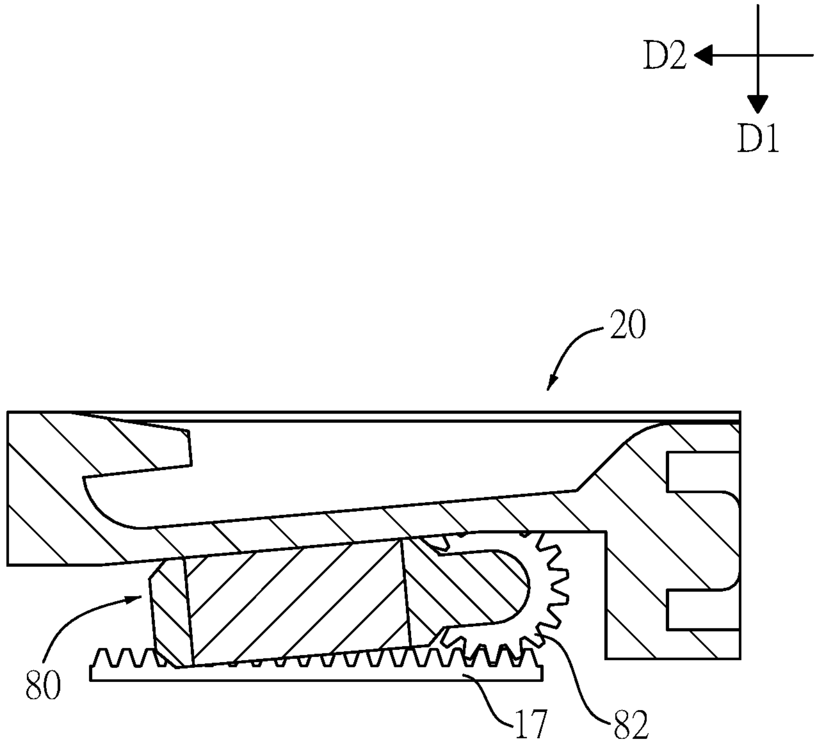
FIG. 24 is a side view of the tilting component of the magnetic buckle device in still another configuration.

Please refer to FIG. 24. In the second embodiment of the tilting component 80, at least one rack 17 is mounted on the inner surface(s) of the first base 10. Preferably, there are two racks 17 respectively mounted on the two inner surfaces of the first base 10 and said two inner surfaces face to each other. In addition, at least one toothed unit 82 is mounted on a pivotal shaft of the tilting component 80, and said pivotal shaft is pivotally mounted on the second base 20. Preferably, one toothed unit 82 is mounted on each one of two ends of the pivotal shaft. Thus, the two toothed units 82 are engaged with the two racks 17 respectively, and thereby when the second base 20 is moved in the disengaging direction D2, the toothed units 82 will be moved and rotated on the racks 17, thereby tilting the tilting component 80 with respect to the second base 20. Precisely, each one of the toothed units 82 may be a gear or may only have one tooth, as long as the toothed units 82 can engage with the racks 17.

Figure 20:
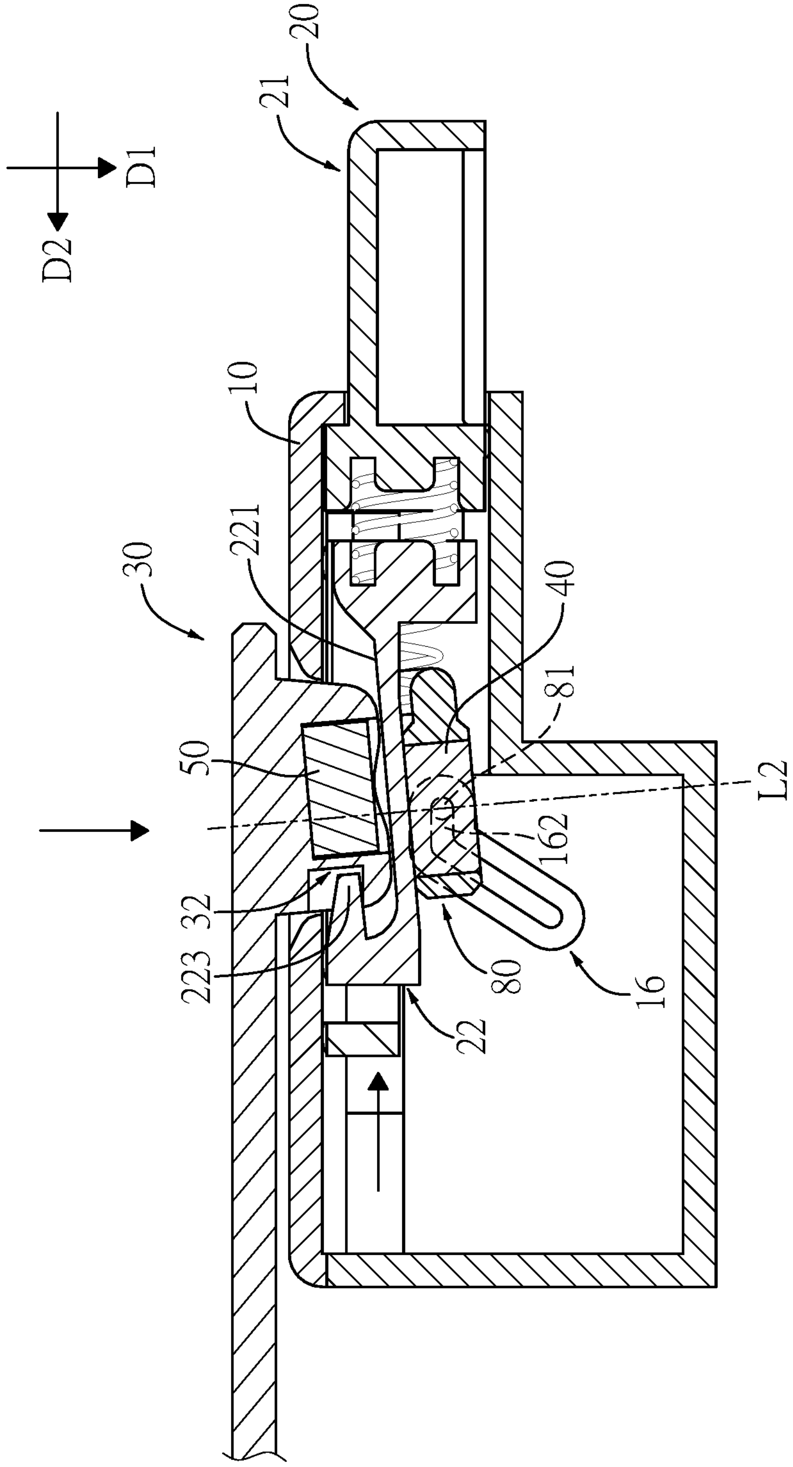
Figure 21:
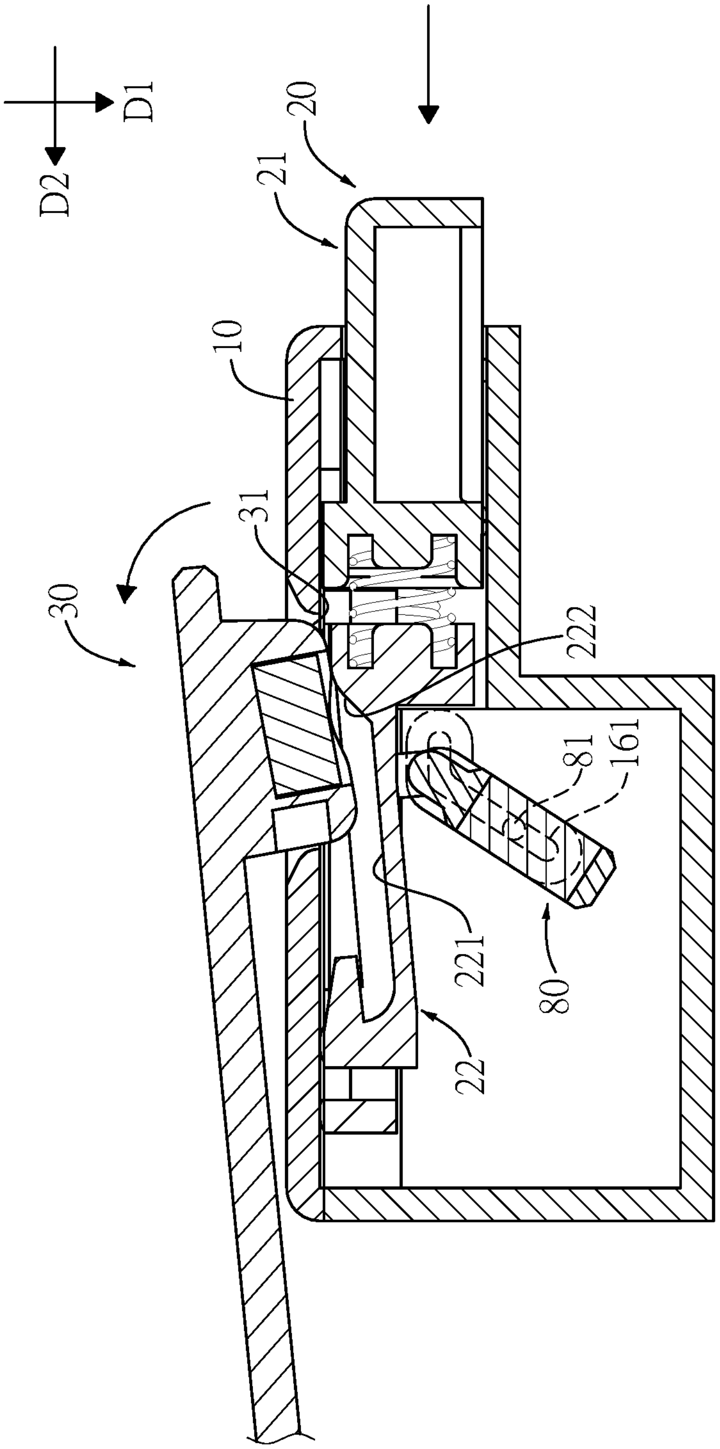

Please refer to FIGS. 18 to 20. The second base 20 may also comprise a base body 21 and a displacement component 22. When the inserting component 30 is inserted into the first base 10 and the engaging portion 223 of the displacement component 22 is moved to engage with the engaging recess 32 of the inserting component 30, the abutting rods 81 of the tilting component 80 will be moved from one end of the tilting sections 161 to the engaging sections 162. At this time, the engaging section 162 is configured to avoid interference.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A magnetic buckle device comprising:

a first base;

an inserting component capable of being moved in an engaging direction and inserted into the first base, the inserting component thereby being in a buckled state;

a second base movably mounted in the first base, the inserting component thereby being in an unbuckled state;

a first component mounted on the second base;

a second component mounted on the inserting component; wherein when the inserting component is inserted into the first base along the engaging direction, a magnetic attraction force is generated between the first component and the second component, thereby maintaining the inserting component in the buckled state; and a magnetic unlocking mechanism mounted on the second base and including a third component mounted on the second base, wherein when the second base is pushed to move in a disengaging direction, the first component moves away from the second component, the third component moves close to the second component, and a magnetic repulsion force is generated between the third component and the second component to thereby eject the inserting component out of the first base by the magnetic repulsion force generated between the third component and the second component, and wherein the disengaging direction and the engaging direction are different.

2. The magnetic buckle device as claimed in claim 1, further comprising:

at least one second-base elastic component configured to push the second base in an opposite direction of the disengaging direction.

3. The magnetic buckle device as claimed in claim 1, wherein a centerline of the first component is non-perpendicular to the disengaging direction.

4. The magnetic buckle device as claimed in claim 1, wherein:

the second base comprises:

an abutting surface, a normal of the abutting surface being non-perpendicular to the disengaging direction;

the inserting component comprises:

an end located in the first base; and when the inserting component is inserted into the first base along the engaging direction and converted into the buckled state, the end of the inserting component contacts the abutting surface of the second base.

5. The magnetic buckle device as claimed in claim 1, wherein when the inserting component is converted into the unbuckled state via the movement of the second base with respect to the first base, the inserting component is moved out of the first base but still contacts the first base via the magnetic attraction force between the first component and the second component.

6. The magnetic buckle device as claimed in claim 5, wherein when the inserting component is converted into the unbuckled state via the movement of the second base with respect to the first base, the inserting component is obliquely pushed out of the first base via the magnetic attraction force between the first component and the second component.

7. The magnetic buckle device as claimed in claim 1, wherein:

the first base comprises a stopping portion; wherein when the inserting component is converted into the unbuckled state via the movement of the second base with respect to the first base, the stopping portion abuts the inserting component to prevent the inserting component from moving along with the second base.

8. A magnetic buckle device comprising:

a first base;

an inserting component capable of being moved in an engaging direction and inserted into the first base, the inserting component thereby being in a buckled state;

a second base movably mounted in the first base, the inserting component thereby being in an unbuckled state;

a first component mounted on the second base;

a second component mounted on the inserting component; wherein when the inserting component is inserted into the first base along the engaging direction, a magnetic attraction force is generated between the first component and the second component, thereby maintaining the inserting component in the buckled state; and a magnetic unlocking mechanism mounted on the second base and including a tilting component pivotally mounted on the second base and connected with the first base, the first component mounted on the tilting component, wherein when the second base is pushed to move in a disengaging direction, the tilting component is tilted with respect to the second base, and the first component is tilted along with the tilting component, thereby generating a magnetic repulsion force between the first component and the second component to eject the inserting component out of the first base, and wherein the disengaging direction and the engaging direction are different.

9. The magnetic buckle device as claimed in claim 8, wherein the tilting component is pivotally mounted on the second base via an edge of the tilting component and selectively contacts a bottom surface of the second base according to locations of the second base.

10. The magnetic buckle device as claimed in claim 9, wherein when the second base is not pushed by any external force, the tilting component is tilted upward to contact the bottom surface of the second base and a magnetic attraction force is generated between the first component and the second component which assists with maintaining the inserting component in the buckled state.

11. The magnetic buckle device as claimed in claim 8, wherein the tilting component is tilted for over 90 degrees in a process that the second base does not undergo any external force until the second base is moved to an inner most end of a stroke of the second base under an external force.

12. The magnetic buckle device as claimed in claim 8, wherein:

the first base comprises:

two inner surfaces facing each other; and two guiding portions respectively mounted on the two inner surfaces;

two opposite sides of the tilting component respectively abut the two guiding portions; and when the second base is moved in the disengaging direction, the tilting component moved along with the second base is guided to tilt by the two guiding portions.

13. The magnetic buckle device as claimed in claim 8, wherein:

the first base comprises:

an inner surface; and at least one rack mounted on the inner surface;

the tilting component comprises:

a pivotal shaft pivotally mounted on the second base; and at least one toothed unit mounted on the pivotal shaft and engaged with the at least one rack; and when the second base is moved in the disengaging direction, the at least one toothed unit is moved and rotated on the at least one rack and thereby the tilting component is tilted with respect to the second base.

14. A magnetic buckle device comprising:
a first base;
an inserting component capable of being moved in an engaging direction and inserted into the first base, the inserting component thereby being in a buckled state;
a second base movably mounted in the first base, any one of the first base and the second base being capable of being moved or rotated with respect to the other, the inserting component thereby being in an unbuckled state;
a first component mounted on the second base; and
a second component mounted on the inserting component; wherein when the inserting component is inserted into the first base along the engaging direction, a magnetic attraction force is generated between the first component and the second component, thereby maintaining the inserting component in the buckled state,
wherein when the inserting component is converted into the unbuckled state via the first base and the second base moving or rotating with respect to each other, a force is generated in an opposite direction of the engaging direction to confront the magnetic attraction force between the first component and the second component, and thereby a side of the inserting component opposite the disengaging direction is lifted and thus an angle between the first component and the second component is changed, which assists with ejecting the inserting component out of the first base.

15. The magnetic buckle device as claimed in claim 14, wherein:
the second base comprises:
an abutting surface; and
a tilting-abutting portion protruding on the abutting surface; and
when the inserting component is converted into the unbuckled state via the first base and the second base moving or rotating with respect to each other, the tilting-abutting portion pushes the side of the inserting component opposite the disengaging direction toward an opposite direction of the engaging direction, and thereby the force opposite the engaging direction is generated.

16. A magnetic buckle device, comprising:
a first base;
an inserting component capable of being moved in an engaging direction and inserted into the first base, the inserting component thereby being in a buckled state;
a second base movably mounted in the first base, any one of the first base and the second base being capable of being moved or rotated with respect to the other, the inserting component thereby being in an unbuckled state;
a first component mounted on the second base; and
a second component mounted on the inserting component; wherein when the inserting component is inserted into the first base along the engaging direction, a magnetic attraction force is generated between the first component and the second component, thereby maintaining the inserting component in the buckled state,
wherein:
the second base comprises:
a base body; and
a displacement component movably mounted in the base body and the first component mounted on the displacement component;
when the inserting component is converted into the buckled state via the inserting component inserted into the first base along the engaging direction, the displacement component is moved to engage the inserting component via the magnetic attraction force between the first component and the second component, which converts the inserting component into the buckled state.

17. The magnetic buckle device as claimed in claim 16 further comprising:
a displacement-component elastic component configured to push the displacement component away from the inserting component with respect to the base body.

* * * * *